United States Patent
Ullah et al.

(10) Patent No.: US 9,204,376 B2
(45) Date of Patent: Dec. 1, 2015

(54) PROFILE BASED PASSIVE NETWORK SWITCHING

(71) Applicants: Shah Ullah, San Francisco, CA (US); Niaz Ferdaus Khan, Sunnyvale, CA (US)

(72) Inventors: Shah Ullah, San Francisco, CA (US); Niaz Ferdaus Khan, Sunnyvale, CA (US)

(73) Assignee: OMNITRAIL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 13/904,151

(22) Filed: May 29, 2013

(65) Prior Publication Data

US 2013/0259020 A1    Oct. 3, 2013

Related U.S. Application Data

(63) Continuation of application No. 13/651,097, filed on Oct. 12, 2012.

(60) Provisional application No. 61/546,086, filed on Oct. 12, 2011.

(51) Int. Cl.
*H04W 48/16* (2009.01)
*G01S 5/02* (2010.01)
(Continued)

(52) U.S. Cl.
CPC ............... *H04W 48/16* (2013.01); *G01S 5/02* (2013.01); *G06Q 30/02* (2013.01); *H04L 67/306* (2013.01); *H04W 4/02* (2013.01); *H04W 36/14* (2013.01); *G01S 19/38* (2013.01); *H04L 67/18* (2013.01)

(58) Field of Classification Search
CPC ..... H04W 60/04; H04W 60/00; H04W 88/08; H04W 12/16; H04W 8/24; H04L 63/0876; H04L 63/0884
USPC ............... 370/310, 328, 338; 455/403, 432.1, 455/432.3, 436, 439, 443; 726/3, 16, 17
See application file for complete search history.

(56) References Cited

U.S. PATENT DOCUMENTS 4,646,145 A   2/1987  Percy et al.
4,695,879 A   9/1987  Weinblatt
(Continued)

FOREIGN PATENT DOCUMENTS

JP   2004-15725   1/2015

OTHER PUBLICATIONS

US 7,904,329, 03/2011, Ullah (withdrawn).
(Continued)

*Primary Examiner* — Un C Cho
*Assistant Examiner* — Siming Liu
(74) *Attorney, Agent, or Firm* — Finnegan, Henderson, Farabow, Garrett & Dunner, LLP

(57) ABSTRACT

Profile-based passive network switching of wireless mobile devices comprises receiving at a wireless access point a device specific identifier beacon transmitted from a mobile device and extracting a device specific identifier from the beacon. The access point then transmits the device specific identifier and access point provider information to a networked server configured with presence network switching software for determining network switching requirements based on the transmitted device specific identifier. The access point then receives mobile device network switching data from the server for processing. The access point then transmits local wireless network authentication and connection information from the access point to the mobile device to facilitate activating a wireless network connection between the mobile device and the access point at which point the access point starts processing wireless communication from the mobile device over the local wireless network.

20 Claims, 28 Drawing Sheets

(51) Int. Cl.
  *G06Q 30/02* (2012.01)
  *H04W 4/02* (2009.01)
  *H04W 36/14* (2009.01)
  *H04L 29/08* (2006.01)
  *G01S 19/38* (2010.01)

(56) References Cited

U.S. PATENT DOCUMENTS

| | | |
|---|---|---|
| 5,550,928 A | 8/1996 | Lu et al. |
| 5,737,539 A | 4/1998 | Edelson et al. |
| 5,842,199 A | 11/1998 | Miller et al. |
| 5,848,396 A | 12/1998 | Gerace |
| 5,920,642 A | 7/1999 | Merjanian |
| 5,991,735 A | 11/1999 | Gerace |
| 6,202,023 B1 | 3/2001 | Hancock et al. |
| 6,332,127 B1 | 12/2001 | Bandera et al. |
| 6,381,465 B1 | 4/2002 | Chern et al. |
| 6,456,854 B1 | 9/2002 | Chern et al. |
| 6,460,036 B1 | 10/2002 | Herz |
| 6,484,148 B1 | 11/2002 | Boyd |
| 6,519,571 B1 | 2/2003 | Guheen et al. |
| 6,571,279 B1 | 5/2003 | Herz et al. |
| 6,587,835 B1 | 7/2003 | Treyz et al. |
| 6,600,898 B1 | 7/2003 | De Bonet et al. |
| 6,674,453 B1 | 1/2004 | Schilit et al. |
| 6,704,929 B1 | 3/2004 | Ozer et al. |
| 6,710,815 B1 | 3/2004 | Billmaier et al. |
| 6,812,851 B1 | 11/2004 | Dukach et al. |
| 6,898,762 B2 | 5/2005 | Ellis et al. |
| 6,947,922 B1 | 9/2005 | Glance |
| 6,990,635 B2 | 1/2006 | Kurapati et al. |
| 6,993,326 B2 | 1/2006 | Link, II et al. |
| 7,039,699 B1 | 5/2006 | Narin et al. |
| 7,065,709 B2 | 6/2006 | Ellis et al. |
| 7,085,845 B2 | 8/2006 | Woodward et al. |
| 7,092,370 B2 | 8/2006 | Jiang et al. |
| 7,107,271 B2 | 9/2006 | Aoki et al. |
| 7,187,947 B1 | 3/2007 | White et al. |
| 7,227,475 B1 | 6/2007 | Provenzano et al. |
| 7,254,367 B2 | 8/2007 | Helden et al. |
| 7,283,803 B2 | 10/2007 | Karaoguz et al. |
| 7,343,317 B2 | 3/2008 | Jokinen et al. |
| 7,403,906 B2 | 7/2008 | Coleman |
| 7,404,010 B1 | 7/2008 | Gardell et al. |
| 7,407,099 B1 | 8/2008 | Bhatti et al. |
| 7,412,202 B2 | 8/2008 | Gutta et al. |
| 7,487,112 B2 | 2/2009 | Barnes, Jr. |
| 7,489,297 B2 | 2/2009 | Hohmann et al. |
| 7,548,915 B2 | 6/2009 | Ramer et al. |
| 7,660,581 B2 | 2/2010 | Ramer et al. |
| 7,668,832 B2 | 2/2010 | Yeh et al. |
| 7,797,447 B1 | 9/2010 | Schilit et al. |
| 7,822,620 B2 | 10/2010 | Dixon et al. |
| 7,853,474 B2 | 12/2010 | Ullah |
| 7,856,372 B2 | 12/2010 | Ullah |
| 7,856,373 B2 | 12/2010 | Ullah |
| 8,060,399 B2 | 11/2011 | Ullah |
| 8,161,172 B2 | 4/2012 | Reisman |
| 8,321,791 B2 | 11/2012 | Dixon et al. |
| 2002/0008626 A1 | 1/2002 | Waters et al. |
| 2002/0031120 A1 | 3/2002 | Rakib |
| 2002/0055924 A1 | 5/2002 | Liming |
| 2002/0059637 A1 | 5/2002 | Rakib |
| 2002/0069037 A1 | 6/2002 | Hendrickson et al. |
| 2002/0104087 A1 | 8/2002 | Schaffer et al. |
| 2002/0120389 A1 | 8/2002 | Fushiki et al. |
| 2002/0124249 A1 | 9/2002 | Shintani et al. |
| 2002/0138848 A1 | 9/2002 | Alao et al. |
| 2002/0184098 A1 | 12/2002 | Giraud et al. |
| 2003/0014307 A1 | 1/2003 | Heng |
| 2003/0032409 A1 | 2/2003 | Hutcheson et al. |
| 2003/0065805 A1 | 4/2003 | Barnes, Jr. |
| 2003/0132298 A1 | 7/2003 | Swartz et al. |
| 2003/0208754 A1 | 11/2003 | Sridhar et al. |
| 2003/0220835 A1 | 11/2003 | Barnes, Jr. |
| 2004/0005900 A1 | 1/2004 | Zilliacus |
| 2004/0068439 A1 | 4/2004 | Elgrably |
| 2004/0088553 A1 | 5/2004 | Levin et al. |
| 2004/0167928 A1 | 8/2004 | Anderson et al. |
| 2004/0201599 A1 | 10/2004 | Dutta |
| 2005/0038326 A1 | 2/2005 | Mathur |
| 2005/0046584 A1 | 3/2005 | Breed |
| 2005/0076014 A1 | 4/2005 | Agarwal et al. |
| 2005/0080665 A1 | 4/2005 | Bowman-Amuah |
| 2005/0120389 A1 | 6/2005 | Boss et al. |
| 2005/0136949 A1 | 6/2005 | Barnes |
| 2005/0159823 A1 | 7/2005 | Hayes et al. |
| 2005/0165784 A1 | 7/2005 | Gomez et al. |
| 2005/0177423 A1 | 8/2005 | Swanson |
| 2005/0278716 A1 | 12/2005 | Koppen et al. |
| 2005/0286489 A1* | 12/2005 | Shin et al. .............. 370/352 |
| 2006/0004627 A1 | 1/2006 | Baluja |
| 2006/0007897 A1 | 1/2006 | Ishii et al. |
| 2006/0022048 A1 | 2/2006 | Johnson |
| 2006/0026067 A1 | 2/2006 | Nicholas et al. |
| 2006/0089099 A1 | 4/2006 | Buchwald et al. |
| 2006/0117104 A1 | 6/2006 | Taniguchi et al. |
| 2006/0123053 A1 | 6/2006 | Scannell |
| 2006/0149624 A1 | 7/2006 | Baluja et al. |
| 2006/0155814 A1 | 7/2006 | Bennett et al. |
| 2006/0165060 A1 | 7/2006 | Dua |
| 2006/0173974 A1 | 8/2006 | Tang |
| 2006/0219776 A1 | 10/2006 | Finn |
| 2006/0271997 A1 | 11/2006 | Jacoby et al. |
| 2006/0277271 A1 | 12/2006 | Morse et al. |
| 2006/0291506 A1 | 12/2006 | Cain |
| 2007/0032219 A1 | 2/2007 | Rudolf et al. |
| 2007/0047043 A1 | 3/2007 | Kapellner et al. |
| 2007/0088801 A1 | 4/2007 | Levkovitz et al. |
| 2007/0088852 A1 | 4/2007 | Levkovitz |
| 2007/0165875 A1 | 7/2007 | Rezvani et al. |
| 2007/0171910 A1* | 7/2007 | Kumar .............. 370/392 |
| 2007/0177554 A1* | 8/2007 | Yang et al. .............. 370/338 |
| 2007/0201376 A1 | 8/2007 | Marshall-Wilson |
| 2007/0244750 A1 | 10/2007 | Grannan et al. |
| 2007/0256135 A1 | 11/2007 | Doradla et al. |
| 2008/0108308 A1 | 5/2008 | Ullah |
| 2008/0109307 A1 | 5/2008 | Ullah |
| 2008/0109843 A1 | 5/2008 | Ullah |
| 2008/0109888 A1 | 5/2008 | Ullah |
| 2008/0125085 A1 | 5/2008 | Ullah |
| 2008/0125086 A1 | 5/2008 | Ullah |
| 2008/0125087 A1 | 5/2008 | Ullah |
| 2008/0125088 A1 | 5/2008 | Ullah |
| 2008/0125089 A1 | 5/2008 | Ullah |
| 2008/0125090 A1 | 5/2008 | Ullah |
| 2008/0125091 A1 | 5/2008 | Ullah |
| 2008/0125092 A1 | 5/2008 | Ullah |
| 2008/0125093 A1 | 5/2008 | Ullah |
| 2008/0126180 A1 | 5/2008 | Ullah |
| 2008/0126181 A1 | 5/2008 | Ullah |
| 2008/0126182 A1 | 5/2008 | Ullah |
| 2008/0126183 A1 | 5/2008 | Ullah |
| 2008/0126184 A1 | 5/2008 | Ullah |
| 2008/0126185 A1 | 5/2008 | Ullah |
| 2008/0126186 A1 | 5/2008 | Ullah |
| 2008/0126198 A1 | 5/2008 | Ullah |
| 2008/0126199 A1 | 5/2008 | Ullah |
| 2008/0126200 A1 | 5/2008 | Ullah |
| 2008/0126201 A1 | 5/2008 | Ullah |
| 2008/0126202 A1 | 5/2008 | Ullah |
| 2008/0126203 A1 | 5/2008 | Ullah |
| 2008/0133327 A1 | 6/2008 | Ullah |
| 2008/0133328 A1 | 6/2008 | Ullah |
| 2008/0133329 A1 | 6/2008 | Ullah |
| 2008/0133330 A1 | 6/2008 | Ullah |
| 2008/0133331 A1 | 6/2008 | Ullah |
| 2008/0133332 A1 | 6/2008 | Ullah |
| 2008/0133333 A1 | 6/2008 | Ullah |
| 2008/0133334 A1 | 6/2008 | Ullah |
| 2008/0133335 A1 | 6/2008 | Ullah |
| 2008/0133352 A1 | 6/2008 | Ullah |
| 2008/0133353 A1 | 6/2008 | Ullah |
| 2008/0133354 A1 | 6/2008 | Ullah |

(56) References Cited

U.S. PATENT DOCUMENTS

| | | | |
|---|---|---|---|
| 2008/0133355 A1 | 6/2008 | Ullah | |
| 2008/0133356 A1 | 6/2008 | Ullah | |
| 2008/0133357 A1 | 6/2008 | Ullah | |
| 2008/0133358 A1 | 6/2008 | Ullah | |
| 2008/0133359 A1 | 6/2008 | Ullah | |
| 2008/0133360 A1 | 6/2008 | Ullah | |
| 2008/0133361 A1 | 6/2008 | Ullah | |
| 2008/0133362 A1 | 6/2008 | Ullah | |
| 2008/0133363 A1 | 6/2008 | Ullah | |
| 2008/0133364 A1 | 6/2008 | Ullah | |
| 2008/0195861 A1* | 8/2008 | Salomone | 713/155 |
| 2008/0207171 A1 | 8/2008 | van Willigenburg et al. | |
| 2008/0220760 A1 | 9/2008 | Ullah | |
| 2008/0301773 A1 | 12/2008 | Achtari et al. | |
| 2009/0025059 A1 | 1/2009 | Wang et al. | |
| 2009/0076875 A1 | 3/2009 | Lert, Jr. et al. | |
| 2009/0252129 A1* | 10/2009 | Jaakkola | 370/338 |
| 2009/0298514 A1 | 12/2009 | Ullah | |
| 2010/0041373 A1* | 2/2010 | Ramankutty et al. | 455/411 |
| 2010/0080202 A1* | 4/2010 | Hanson | 370/338 |
| 2010/0093382 A1 | 4/2010 | Samaha | |
| 2010/0121567 A1 | 5/2010 | Mendelson | |
| 2010/0246547 A1 | 9/2010 | Yoon | |
| 2011/0153429 A1 | 6/2011 | Ullah | |
| 2012/0136721 A1 | 5/2012 | Ullah | |
| 2012/0173732 A1 | 7/2012 | Sullivan | |
| 2012/0185458 A1 | 7/2012 | Liu et al. | |
| 2012/0185942 A1 | 7/2012 | Dixon et al. | |
| 2012/0323685 A1 | 12/2012 | Ullah | |
| 2013/0128755 A1 | 5/2013 | Ullah et al. | |

OTHER PUBLICATIONS

"U.S. Appl. No. 11/855,122, Non-Final Office Action mailed Dec. 24, 2009", 7 pages.

"U.S. Appl. No. 11/855,685, Non-Final Office Action mailed Aug. 31, 2010", 23 pages.

"U.S. Appl. No. 11/855,811, Non-Final Office Action mailed Jul. 22, 2010", 20 pages.

"U.S. Appl. No. 11/855,820, Non-Final Office Action mailed Mar. 22, 2011", 34 pages.

"U.S. Appl. No. 11/925,967, Final Office Action mailed Sep. 30, 2009", 17 pages.

"U.S. Appl. No. 11/925,967, Non-Final Office Action mailed Nov. 9, 2010", 20 pages.

"U.S. Appl. No. 11/925,967, Non-Final Office Action mailed Mar. 16, 2009", 9 pages.

"U.S. Appl. No. 11/925,969, Non-Final Office Action mailed May 12, 2010", 9 pages.

"U.S. Appl. No. 11/925,970, Final Office Action mailed Oct. 5, 2009", 12 pages.

"U.S. Appl. No. 11/925,970, Non-Final Office Action mailed Nov. 9, 2010", 20 pages.

"U.S. Appl. No. 11/925,970, Non-Final Office Action mailed Mar. 16, 2009", 9 pages.

"U.S. Appl. No. 11/925,971, Final Office Action mailed Mar. 30, 2010", 22 pages.

"U.S. Appl. No. 11/925,971, Non-Final Office Action mailed Apr. 28, 2009", 9 pages.

"U.S. Appl. No. 11/925,972, Final Office Action mailed Nov. 3, 2009", 25 pages.

"U.S. Appl. No. 11/925,972, Non-Final Office Action mailed Nov. 8, 2010", 27 pages.

"U.S. Appl. No. 11/925,972, Non-Final Office Action mailed Apr. 28, 2009", 9 pages.

"U.S. Appl. No. 11/925,973, Final Office Action mailed Nov. 2, 2009", 18 pages.

"U.S. Appl. No. 11/925,973, Non-Final Office Action mailed Nov. 9, 2010", 22 pages.

"U.S. Appl. No. 11/925,973, Non-Final Office Action mailed Apr. 28, 2009", 9 pages.

"U.S. Appl. No. 11/925,975, Final Office Action mailed Mar. 16, 2010", 23 pages.

"U.S. Appl. No. 11/925,975, Non-Final Office Action mailed Apr. 28, 2009", 9 pages.

"U.S. Appl. No. 11/925,976, Non-Final Office Action mailed Nov. 12, 2009", 8 pages.

"U.S. Appl. No. 11/925,977, Non-Final Office Action mailed Nov. 12, 2009", 8 pages.

"U.S. Appl. No. 11/925,978, Final Office Action mailed May 11, 2010", 18 pages.

"U.S. Appl. No. 11/925,978, Non-Final Office Action mailed Apr. 28, 2009", 9 pages.

"U.S. Appl. No. 11/925,980, Final Office Action mailed Jan. 11, 2010", 16 pages.

"U.S. Appl. No. 11/925,980, Non-Final Office Action mailed Apr. 28, 2009", 9 pages.

"U.S. Appl. No. 11/925,981, Non-Final Office Action mailed Nov. 12, 2009", 8 pages.

"U.S. Appl. No. 11/925,984, Final Office Action mailed Jan. 15, 2010", 15 pages.

"U.S. Appl. No. 11/925,984, Non-Final Office Action mailed Apr. 28, 2009", 9 pages.

"U.S. Appl. No. 11/925,985, Final Office Action mailed Jun. 16, 2009", 12 pages.

"U.S. Appl. No. 11/925,985, Non-Final Office Action mailed Nov. 28, 2008", 9 pages.

"U.S. Appl. No. 11/925,986, Final Office Action mailed Jun. 17, 2009", 13 pages.

"U.S. Appl. No. 11/925,986, Non-Final Office Action mailed Nov. 28, 2008", 9 pages.

"U.S. Appl. No. 11/925,987, Non-Final Office Action mailed Feb. 19, 2010", 9 pages.

"U.S. Appl. No. 11/925,989, Non-Final Office Action mailed May 13, 2009", 9 pages.

"U.S. Appl. No. 11/925,990, Non-Final Office Action mailed May 13, 2009", 9 pages.

"U.S. Appl. No. 11/925,991, Non-Final Office Action mailed Nov. 13, 2009", 9 pages.

"U.S. Appl. No. 11/925,991, Non-Final Office Action mailed Sep. 18, 2008", 7 pages.

"U.S. Appl. No. 11/925,993, Non-Final Office Action mailed Sep. 18, 2008", 7 pages.

"U.S. Appl. No. 111/925,993, Final Office Action mailed Nov. 12, 2009", 9 pages.

"U.S. Appl. No. 11/925,994, Non-Final Office Action mailed May 13, 2009", 9 pages.

"U.S. Appl. No. 11/925,995, Non-Final Office Action mailed Feb. 22, 2010", 9 pages.

"U.S. Appl. No. 11/925,997, Non-Final Office Action mailed Feb. 19, 2010", 9 pages.

"U.S. Appl. No. 11/925,998, Non-Final Office Action mailed Mar. 5, 2010", 9 pages.

"U.S. Appl. No. 11/926,000, Non-Final Office Action mailed Mar. 5, 2010", 9 pages.

"U.S. Appl. No. 11/926,001, Final Office Action mailed Jul. 21, 2010", 13 pages.

"U.S. Appl. No. 11/926,001, Non-Final Office Action mailed Sep. 2, 2009", 9 pages.

"U.S. Appl. No. 11/926,002, Non-Final Office Action mailed May 13, 2009", 9 pages.

"U.S. Appl. No. 11/926,003, Non-Final Office Action mailed May 29, 2009", 9 pages.

"U.S. Appl. No. 11/926,004, Non-Final Office Action mailed May 28, 2009", 9 pages.

"U.S. Appl. No. 11/926,005, Non-Final Office Action mailed May 28, 2009", 9 pages.

"U.S. Appl. No. 11/926,007, Non-Final Office Action mailed May 28, 2009", 9 pages.

"U.S. Appl. No. 11/926,008, Final Office Action mailed May 20, 2010", 18 pages.

"U.S. Appl. No. 11/926,008, Non-Final Office Action mailed Aug. 20, 2009", 9 pages.

(56) References Cited

OTHER PUBLICATIONS

"U.S. Appl. No. 11/926,009, Final Office Action mailed May 27, 2010", 20 pages.

"U.S. Appl. No. 11/926,009, Non-Final Office Action mailed Mar. 21, 2011", 11 pages.

"U.S. Appl. No. 11/926,009, Non-Final Office Action mailed Aug. 19, 2009", 9 pages.

"U.S. Appl. No. 11/926,010, Final Office Action mailed May 20, 2010", 18 pages.

"U.S. Appl. No. 11/926,010, Non-Final Office Action mailed Aug. 19, 2009", 9 pages.

"U.S. Appl. No. 11/926,010, Notice of Allowance mailed Oct. 27, 2010", 13 pages.

"U.S. Appl. No. 11/926,010, Notice of Allowance mailed Aug. 5, 2010", 17 pages.

"U.S. Appl. No. 11/926,011, Final Office Action mailed Jun. 8, 2010", 20 pages.

"U.S. Appl. No. 11/926,011, Non-Final Office Action mailed Sep. 3, 2009", 9 pages.

"U.S. Appl. No. 11/926,011, Notice of Allowance mailed Oct. 27, 2010", 13 pages.

"U.S. Appl. No. 11/926,014, Final Office Action mailed Nov. 13, 2009", 14 pages.

"U.S. Appl. No. 11/926,014, Non-Final Office Action mailed Apr. 2, 2009", 8 pages.

"U.S. Appl. No. 11/926,015, Final Office Action mailed Jun. 7, 2010", 18 pages.

"U.S. Appl. No. 11/926,015, Non-Final Office Action mailed Sep. 2, 2009", 9 pages.

"U.S. Appl. No. 11/926,016, Final Office Action mailed Jun. 9, 2010", 14 pages.

"U.S. Appl. No. 11/926,016, Non-Final Office Action mailed Sep. 2, 2009", 9 pages.

"U.S. Appl. No. 11/926,017, Final Office Action mailed Dec. 20, 2010", 22 pages.

"U.S. Appl. No. 11/926,017, Non-Final Office Action mailed Mar. 24, 2010", 12 pages.

"U.S. Appl. No. 11/926,018, Non-Final Office Action mailed Mar. 23, 2010", 12 pages.

"U.S. Appl. No. 11/926,019, Non-Final Office Action mailed Mar. 24, 2010", 12 pages.

"U.S. Appl. No. 11/926,020 Non-Final Office Action mailed Mar. 24, 2010", 12 pages.

"U.S. Appl. No. 11/926,021, Non-Final Office Action mailed Mar. 23, 2010", 12 pages.

"U.S. Appl. No. 11/926,022, Non-Final Office Action mailed Mar. 30, 2010", 9 pages.

"U.S. Appl. No. 11/926,024, Final Office Action mailed Nov. 12, 2009", 10 pages.

"U.S. Appl. No. 11/926,024, Non-Final Office Action mailed Apr. 2, 2009", 8 pages.

"U.S. Appl. No. 12/357,295, Final Office Action mailed Feb. 29, 2012", 18 pages.

"U.S. Appl. No. 12/357,295, Non-Final Office Action mailed Aug. 5, 2011", 29 pages.

"U.S. Appl. No. 13/040,475, Non-Final Office Action mailed Apr. 18, 2011", 22 pages.

"U.S. Appl. No. 13/040,475, Notice of Allowance mailed Aug. 2, 2011", 9 pages.

"U.S. Appl. No. 13/238,830, Non-Final Office Action mailed Apr. 16, 2012", 33 pages.

"U.S. Appl. No. 13/594,360, Final Office Action mailed Oct. 25, 2012", 14 pages.

McCune, "Seeing-Is-Believing: Using Camera Phones for Human-Verifiable Authentication", Proceedings of the 2005 IEEE Symposium and Security, (retrieved from internet of Apr. 2, 2008 at http://www.ece.cmu.edu/research/publications/2005/CMU-ECE-2005-006.pdf, May 2005, pp. 110-124.

PCT/US2012/060087, "International Application Serial No. PCT/US2012/060087, International Preliminary Report on Patentability and Written Opinion mailed Apr. 24, 2014", Shah Ullah, 7 Pages.

Extended European Search Report for Application No. EP 12840465.4, issued Sep. 18, 2015 (17 pages).

\* cited by examiner

PROFILE BASED PASSIVE NETWORK SWITCHING

CROSS-REFERENCE TO RELATED APPLICATIONS

This application is a continuation of U.S. Ser. No. 13/651,097, filed Oct. 12, 2012, which is hereby incorporated by reference in its entirety.

U.S. Ser. No. 13/651,097 claims the benefit of U.S. provisional Ser. No. 61/546,086, filed Oct. 12, 2011, which is hereby incorporated by reference in its entirety.

This application is also related to the following U.S. patent applications each of which is incorporated by reference herein in its entirety: U.S. Ser. No. 11/926,010, filed Oct. 28, 2007, now U.S. Pat. No. 7,853,474, issued Dec. 14, 2010; U.S. Ser. No. 11/926,016, filed Oct. 28, 2007 now U.S. Pat. No. 7,856,373, issued Dec. 21, 2010; U.S. Ser. No. 11/926,011, filed Oct. 28, 2007 now U.S. Pat. No. 7,856,372, issued Dec. 21, 2010; U.S. Ser. No. 13/040,475, filed Mar. 4, 2011 now U.S. Pat. No. 8,060,399, issued Nov. 15, 2011.

BACKGROUND

1. Field

The methods and systems described herein generally relate to wireless device network authentication and particularly relate to passive device and user identification for wireless network transition.

2. Description of the Related Art

Devices using the 802.11 specifications for communications use a 12 octet field called the MAC address to identify themselves to other devices. Every packet that is transmitted wirelessly consists of a MAC header that includes the source and/or the intended destination device's MAC address. These packets are absorbed by all radio devices, where the MAC sub-layer checks the MAC address field and then either discards or passes the packet onto higher data link layers for further processing.

MAC addresses are often "hard-coded" onto connectivity chips and irreversible but newer radio chips allow the MAC address to be changed through software. This has allowed use of anonymous MAC addresses for the purposes of protecting identity, to change the MAC information in packets or using a lookup table or some other method for intelligent packet routing using multiple MAC addresses, assignment of MAC addresses on a network to each device to prevent MAC address duplication and for the cloning of one device's MAC address onto another device.

Although data transmitted in wireless packets may be encrypted if it is a secure network, MAC addresses are not encrypted as they are used to filter the packet's destination before any further processing takes place. By modifying device driver software, it is possible to accept all incoming packets regardless of the MAC address specified in the MAC header. This allows a roaming radio device with modified device driver software to listen for wireless packets, check their MAC headers and identify the MAC addresses of other radio devices in its proximity without the knowledge or prior authorization of the device's owner.

Currently, various telecommunications solutions categorized under fixed-mobile-convergence (FMC) and/or unlicensed mobile access (UMA) allow for a voice/data payload transition ("handoff" or "handover") from a primary, automatically authenticated (no end user interaction required) wide area radio access network such as the networks of cellular towers (base transceiver stations) operated by mobile carriers to secondary, user-initiated, open/secure (free, conditional, or for-pay) destination wireless networks. The latter include a variety of wireless wide, regional and local area networks (WANs, WRANs and WLANs respectively) with the most commercially adopted being WLANs based on the IEEE 802.11 standards operating in unlicensed radio frequency spectrum, commonly referred to as Wi-Fi. This particular example of a mobile device transitioning from a single, primary WAN operated by a mobile carrier to a secondary set of Wi-Fi networks operated by any number of outside parties is a significant driver of the aforementioned FMC/UMA solutions currently being offered by solutions providers. However, most current implementations of FMC solutions require active end-user engagement (non-passive) before they can facilitate the payload transition between the primary and destination radio access networks.

In the case of a payload transition from a mobile carrier operated WAN to a destination WLAN, this end-user engagement is often required due to a need for authenticating the end-user device on the destination WLAN or authenticating both the end-user device and the WLAN for clearance from the mobile carrier operated WAN. Existing IEEE protocols such as 802.21, published in 2008, specifically allow for a better seamless transition between wireless networks on different spectrums once they have been authenticated and a connection has been established but to establish the initial connection, manual end-user engagements are still required. These active end-user engagements often include manually downloading mobile device client software and/or manual authentication on the desired destination WLAN and subsequently repeating the process for each new desired destination WLAN. As it relates to manual engagements on Wi-Fi networks for example, the end-user often has to enter a service-set identifier or SSID (for hidden Wi-Fi networks) or pick an SSID from a list of broadcasted SSIDs. If the destination network is a secure one, the end-user may also be required to manually provide a key for authentication as well.

To further end-user adoption of this particular use-case of transitioning from a mobile carrier operated WAN to a WLAN, and its enabling solutions, various stakeholders in the wireless networking, manufacturing, and service provider ecosystem have embraced the concept of a generic access network (GAN) that takes advantage of a connection to the primary, mobile-carrier operated radio access network to make authentication of end-user devices and payload transitions to secondary Wi-Fi networks a more seamless end-user experience by detecting when an end-user's device establishes a simultaneous WLAN connection (in addition to a primary WAN connection) and enabling a seamless payload handover to the WLAN. Amendments to the IEEE 802.11 protocols, namely 802.11u, have been established to advertise information on Wi-Fi networks so that end-users can choose the networks that they have access privileges to i.e. Wi-Fi networks offered by the third-parties such as a non-primary, foreign or "roaming partner" mobile network operators.

Despite these innovations, most implementations of fixed-mobile-convergence solutions with generic access networks would still require an initial manual transition for the first use of each new secondary destination network. This is because although the primary network authentication is automatic (a mobile carrier has stores of subscriber and corresponding end-user device information on remote servers) the payload transition also relies on the successful authentication of the end-user's mobile device to the destination network which as mentioned, is initially always manual. The GAN only functions seamlessly once the user has seamlessly authenticated a given mobile device on the destination network. However, most destination networks (and all WLANS operating on 802.11), in contrast to most mobile network operators, can only allow for a seamless transition by storing authentication data on the end-users devices versus in a remotely controlled data store. This will require the end-user to perform at least one manual authentication per new destination radio access network.

SUMMARY

The methods and systems described herein may create a transformed MAC address using a remotely assigned key for the purposes of wireless packet transmission which may or may not be stored locally. By transforming the MAC address (e.g. by adding time as a variable to the transformation) the transformed MAC address may change over time; thereby making the transmitted MAC address dynamic so that MAC addresses received by a given radio access network may be dispensable periodically (e.g. hourly, daily, etc.). Since the transformation may only be done locally at the point of transmission any other uses for the MAC address such as packet routing can still be accomplished once the MAC address in the header has been reverse transformed. The transformed MAC address can also be used as a device specific identifier (DSI) as described herein.

The methods and systems described herein may circumvent the need for the end-user to manually authenticate even a first connection to a new destination radio access network by causing the end-user's mobile device to automatically emit a unique device-specific identifier (DSI) that can be passively absorbed by the WLAN with software that can detect it. This process is also referred to as presence or passive presence herein. In an example, the DSI of the end-user's mobile device, along with an identifier for the WLAN is passed on to a modified Generic Access Network Controller that can seamlessly absorb this information and then authenticate the user on the WLAN operated by either the mobile network operators or their independent, third-party WLAN network operator partners. The proposed invention also has the additional benefit of being resistant to user-modifications on the client device since each device is uniquely identified. Additionally software placed in the modified access points can allow for simultaneous network connections using existing protocols and methods as well as existing protocols and methods for the purposes of seamless handover enabled herein.

Historically, transitioning between mobile network operator WANs has been an easier and more consistent end-user experience due to the best practices established by large mobile network operators (i.e transitioning from a "home" cellular network to a "roaming" network). The methods and systems described herein may utilize automatically emitted and passively absorbed device specific identifiers to enable a simplified and seamless end-user experience for transitioning between any two incongruent radio access networks. The enclosed methods and systems can also be an alternative method to enable seamless transitioning between two WANs (i.e. a "home" cellular network to a "roaming" network).

The methods and systems described herein also provide a more feasible alternative for providing network access to end-user devices in areas with low WAN signal (e.g. cellular) or no access to mobile-carrier WANs. The proposed invention can leverage other existing wireless network hardware where available by modifying existing software resident on said hardware. In contrast to existing solutions such as femtocells (also commercially referred to as "small cells" and "picocells"), which are mobile network operator-specific as they utilize each mobile network operator's unique radio frequency spectrum and corresponding radio access network interface, in the proposed invention, is in many situations, a more suitable alternative as it provides access on unlicensed radio spectrums available to a wider range of end user devices and with the passive transition benefits of femtocells. To clarify, a device transitioning from a cellular base station transceiver to a femtocell can only make the transition if the radio access network interface of the end user's mobile device and the radio access network interface of the femtocell have common hardware and software and operate on the same licensed frequency (the last being a proxy for determining the first factor of authentication for which mobile network operator the device has access rights for). This means the seamless handover can only be realized if the femtocell or other secondary radio access network mimic's the primary network's radio access interface. However, the proposed invention enables a mobile device belonging to a primary mobile network to seamlessly transition to a secondary mobile network that has fundamentally incongruent properties including operating on licensed/unlicensed frequencies, having a different hardware/software network interface for radio access, etc. The most common of this type of transition would be used to transition a mobile device from a mobile network operator's radio access network comprised largely of cellular base station transceivers over to a WLAN (Wi-Fi router)—something that is not possible with existing solutions.

Methods and systems described herein may include a method of profile-based passive network switching, comprising receiving at a wireless access point a device specific identifier beacon transmitted from a mobile device; extracting a device specific identifier from the beacon; transmitting the device specific identifier and access point provider information to a networked server configured with presence network switching software for determining network switching requirements based on the transmitted device specific identifier; receiving mobile device network switching data from the server; transmitting local wireless network authentication and connection information from the access point to the mobile device to facilitate activating a wireless network connection between the mobile device and the access point; and processing wireless communication from the mobile device over the local wireless network. In the method the beacon is transmitted over an 802.11 compliant radio frequency channel. In the method the beacon comprises a recipient independent recipient address. Alternatively, in the method the local wireless network is unknown to the mobile device prior to the local wireless network transmitting local wireless network authentication and connection information. In the method, processing wireless communication initiates an initial use of the local wireless network by the mobile device. The method may further include in response to receiving the beacon at the access point, transmitting an electronic response over a wireless signal to the mobile device. The method may further include determining a signal strength of a radio signal between the mobile device and the access point. The method may further include time stamping the received beacon prior to extracting the device specific identifier. In the method, the access point is adapted to receive and extract a device specific identifier from the beacon. Alternatively, in the method the beacon is an emergency beacon based on a high priority field of the beacon being activated.

The methods and systems described herein may include a method of transferring a call from a cellular network to an IP network based on profile-based passive network switching, comprising: receiving at a wireless access point a device specific identifier beacon from a mobile device engaged in a call over a cellular network; extracting a device specific identifier from the beacon; transmitting the device specific identifier and access point provider information to a networked server configured with presence network switching software for determining cellular network provider call switching requirements based on the transmitted device specific identifier; receiving mobile device call switching data from the server; transmitting local wireless network authentication and connection information from the access point to the mobile device to facilitate activating a local wireless connection between the access point and the mobile device; and facilitating routing of the call through the local wireless network. In the method, the beacon is transmitted over an 802.11 compliant radio frequency channel. In the method, the beacon comprises a recipient independent recipient address. In the method, the local wireless network is unknown to the mobile device prior to the local wireless network transmitting local wireless network authentication and connection information. In the method, processing wireless communication initiates an initial use of the local wireless network by the mobile device. The method may further include in response to receiving the beacon at the access point, transmitting an electronic response over a wireless signal to the mobile device. The method may further include determining a signal strength of a radio signal between the mobile device and the access point. The method may further include time stamping the received beacon prior to extracting the device specific identifier. In the method, the access point is adapted to receive and extract a device specific identifier from the beacon. In the method, routing of the call through the local wireless network includes ending use of the cellular network for the call.

Methods and systems described herein may include a method of transferring a data flow from a cellular network to an IP network based on profile based passive network switching, comprising: receiving at a wireless access point a device specific identifier beacon from a mobile device using a cellular data network; extracting a device specific identifier from the beacon; transmitting the device specific identifier and access point provider information to a networked server configured with presence network switching software for determining cellular network provider call switching requirements based on the transmitted device specific identifier; receiving mobile device call switching data from the server; transmitting local wireless network authentication and connection information from the access point to the mobile device to facilitate activating a local wireless connection between the access point and the mobile device; and facilitating data network connection of the mobile device via the local wireless network rather than through the cellular data network.

The methods and systems described herein may include a wireless access point adapted to detect a device specific identifier beacon comprising; a wireless router comprising: MAC layer functionality adapted to identify presence data packets; presence functionality to interface with the adapted MAC layer functionality to send and receive presence data in the packets; and presence client functionality to interface with the presence functionality to communicate the presence data with an externally networked presence server. In the access point, a recipient address of the presence data packets is recipient independent. In the access point, a recipient address of the presence data packets is 0xFFFFFFFFFFFF. The access point performs signal strength detection on a wireless signal comprising the presence data packets. In the access point, the presence functionality of the access point performs signal strength detection. The access point timestamps identification of at least a first identified presence data packet. In the access point, the presence functionality of the access point performs the timestamping. In the access point, the beacon is detected over an 802.11 compliant radio frequency channel.

The methods and systems described herein may include a method of detecting a device specific identifier beacon comprising: receiving a data packet over a wireless signal at an access point, wherein a recipient address of the data packet is recipient independent; forwarding the received data packet from an adapted MAC layer facility of the access point to an presence facility of the access point; extracting, with the presence facility, a device specific identifier from the data packet; and forwarding the extracted device specific identifier along with access point identification data to an externally networked server adapted to perform presence network switching authorization. In the method, the radio signal is an 802.11 compliant radio frequency channel. The method may further include in response to receiving the beacon at the access point, transmitting an electronic response over a wireless signal to the mobile device. In the method, the device specific identifier comprises a transformed MAC address of a wireless-capable device from which the beacon is received. In the method, a recipient address of the presence data packets is 0xFFFFFFFFFFFF. In the method, the access point performs signal strength detection on a wireless signal comprising the presence data packets. In the method, the presence functionality of the access point performs signal strength detection. In the method, the access point timestamps identification of at least a first identified presence data packet. In the method, the presence functionality of the access point performs the timestamping. In the method, the beacon comprises a device specific identifier that was not previously received by the access point.

The methods and systems described herein may include a mobile handset adapted to generate a device specific identifier beacon comprising; MAC layer functionality adapted to transmit presence beacon packets; and presence functionality to: interface with the adapted MAC layer functionality to configure device specific identifier data into the presence beacon packets; determine a transmission channel for transmitting the beacon packets; determine a beacon transmission interval; and communicate the presence data with an externally networked presence server. In the mobile handset, the presence beacon packets are transmitted over an 802.11 compliant radio frequency channel. In the mobile handset, the device specific identifier comprises a transformed MAC address of the mobile handset. In the mobile handset, a recipient address of the presence data packets is 0xFFFFFFFFFFFF.

The methods and systems described herein may include a method of generating a device specific identifier beacon comprising; taking a MAC address of a mobile device; transforming the MAC address into a device specific identifier with presence firmware operating on the mobile device; determining an presence beacon transmission channel with the presence firmware; transmitting the device specific identifier and the presence beacon transmission channel to adapted MAC layer functionality operating on the mobile device; and transmitting an presence beacon comprising the device specific identifier periodically based on an presence beacon transmission interval. In the method, the presence transmission interval is determined based on responses to the transmitted presence beacon received by the mobile device. In the method, transforming the MAC address is based on a remotely assigned key. In the method, transforming the MAC address comprises byte shifting of the MAC address. In the method, transforming the MAC address is based on a DHCP lease renewal cycle.

The methods and systems described herein may include a method of monetizing transition of wireless communication with a handset from a cellular domain to a wifi domain comprising: receiving at a networked server an indication that a mobile device is using a local wireless network as a result of presence passive network switching from a cellular network; determining a cellular network provider for the cellular network based on an analysis of the indication by the server; calculating a value for the mobile device using the local wireless network instead of the cellular network; and charging the cellular network provider for a portion of the calculated value. In the method, calculating the value is based on cellular network provider specific transition guidelines. In the method, determining a cellular network provider comprises extracting a device specific identifier of the mobile device from the indication and retrieving cellular network provider identification data from a device profile in a database of device profiles based on the extracted device specific identifier.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures.

DETAILED DESCRIPTION

Figure 1:
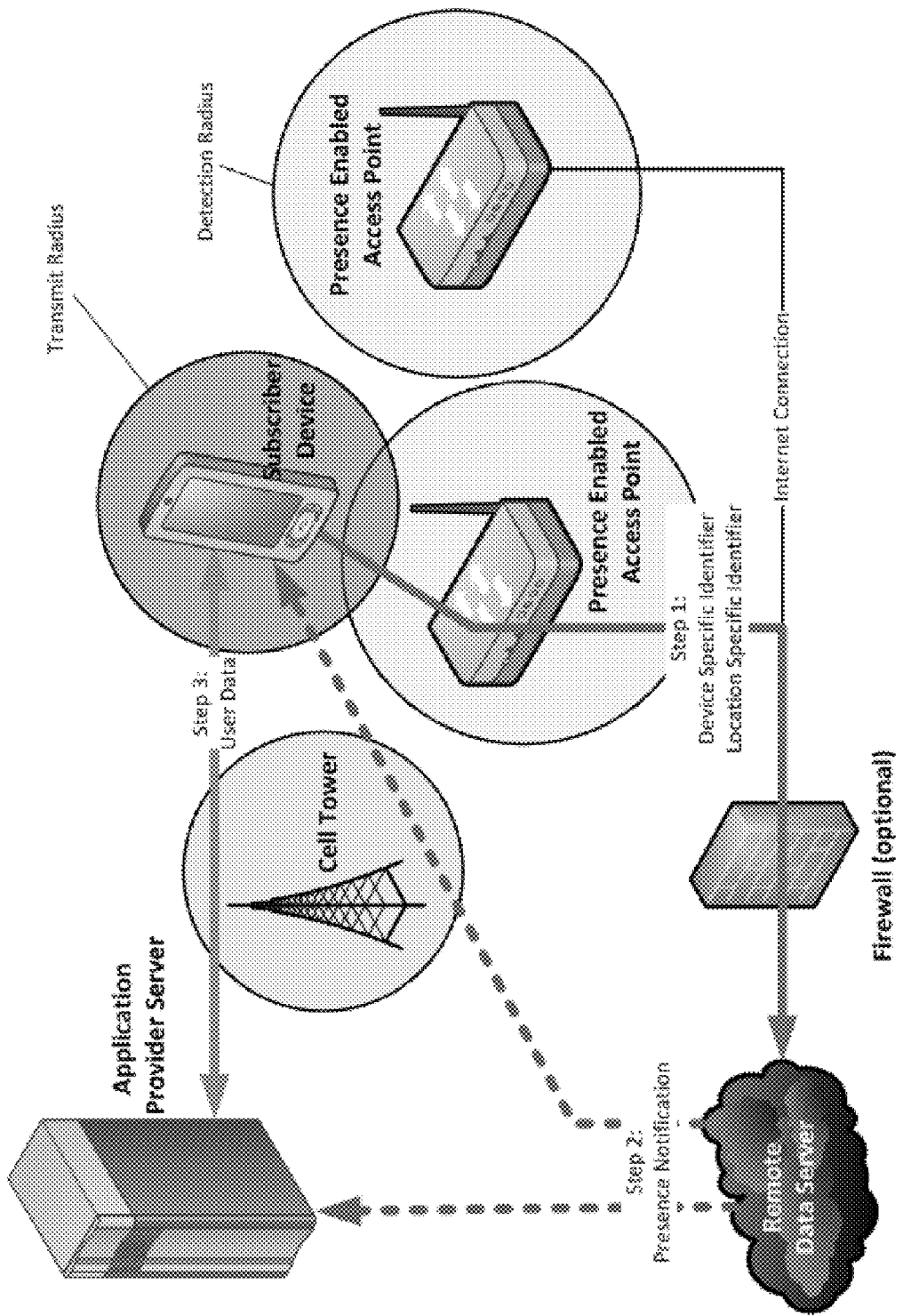
FIG. 1 depicts the major components of a passive network-to-network transition solution, also referred to as the proposed invention or presence framework.

While described herein with reference to various embodiments, it is understood that, in all cases, unless otherwise specified, references to an "embodiment" or "embodiments" refer to one or more exemplary and non-limiting embodiments. Also, it is understood that, in all descriptions herein, unless otherwise specified, even when not explicitly being referenced to an "embodiment" or "embodiments" refer to one or more exemplary and non-limiting embodiments.

Passive device/user profile identification and authentication may be facilitated by a presence platform as described herein so that devices connecting to a wireless network (i.e. Wi-Fi network) may be passively identified and authenticated, without requiring a device user to take any specific action with the mobile device. A Presence Enabled Access Point (PAP) may use any of the methods described herein including methods and systems described herein with a device that emits a unique radio-frequency broadcast or "RF tag" in the form of a device-specific identifier (DSI) beacon. A given RF tag carrying a DSI is passively detected by such a PAP and subsequently referenced to a database or set of databases in remote servers or data stores to determine access rights for the device. Once the rights have been determined, the PAP forwards the necessary information (e.g. SSID and WPA/WPA2 authentication key) to the device for it to successfully connect to the radio access network using a proprietary packet format referred to herein as a proposed presence format. Techniques described in related applications as noted herein that facilitate associating a user and/or device profile with a MAC address and/or DSI may form the basis for determining access rights for the device.

Passive transition of a mobile device from a WAN (e.g. cellular) network also may present opportunities for monetizing such a function. WAN service providers have a fixed spectrum and limited capacity for servicing mobile devices, yet the demand for capacity is continually increasing. Therefore, a WAN service provider may be willing to pay a fee to off-load capacity demand to another network provider. Enterprise-level use of mobile devices, such as for phone calls, could be enhanced by passive transition so that mobile device users may be automatically switched to an enterprise local wireless network (e.g. Wi-Fi) when a user/employee is within an enterprise facility. Also, costs for use of local Wi-Fi services tend to be lower or free relative to WAN services, so enterprises could receive cost savings through passive device transition to local wireless networks (e.g. Wi-Fi). Therefore, enterprises may be willing to pay for the convenience, cost savings, and improved call quality afforded by local wireless routing of mobile device calls/data as compared to WAN-only use or implementing femtocells with the aforementioned lack of compatibility between end-user devices. Therefore, a local wireless network provider may be willing to adapt its networked components as described herein to support the proprietary protocol in return for payment by an enterprise and/or a WAN provider, and the like.

Passive transition may also be controlled at least in part by a WAN provider. A WAN provider may make policies that determine what content or types of communication could be handed over to a local wireless network. Such a policy may include improving quality of service by a presence enabled device determining if a local wireless network signal presents an improvement in quality of service over a WAN network signal. In an example, a WAN (e.g. cellular) network provider may establish a policy that includes a passive transition signal quality threshold that can be used to evaluate a local wireless network signal and thereby determine if transition of data and/or voice is authorized.

Techniques for transforming a networked device MAC address may benefit access points (e.g. Wi-Fi routers) as well as mobile devices in that a transformed MAC address presented as a DSI within the presence environment may reduce the likelihood that unauthorized third parties could determine physical location and/or other information about the access point and its networked environment. Because only presence enabled devices access beaconed DSI's from other presence enabled devices, security is also enhanced because the presence framework can be configured to limit the applications and/or third parties that can have access to device location-related information.

Major components of a passive network-to-network transition solution, herein referred to as the proposed presence solution are depicted in FIG. 1. Passive network-to-network device transition is facilitated at least in part by a Presence API (PAPI) that may provide support for software running on a mobile device and in a passive transition server, such as a remote data server. The PAPI may facilitate interfacing with third party applications when they are installed or uninstalled on the mobile device and when providing presence awareness to application servers. Each application may be identified by an ASI ("Application Specific Identifier") and each subscriber using each application may be identified using an ASUH ("Application Specific User Hash"). For security related purposes, the ASUH may only be shared by the application that generated it and presence framework resources. Only presence resources may have access to a mobile device DSI ("Device Specific Identifier") which may be beaconed by the mobile device.

Adapted radio-chip firmware in communication with presence software running on a mobile device may enable the mobile device to support the presence platform via a beacon issued from the mobile device that may represent a unique DSI. A Presence Enabled Access Point (PAP) may also be referred to herein as a "location server" that has been adapted to support the proprietary presence protocols and functionality described herein. An example presence environment may include a location server or PAP that manages a unique set of LSIs ("Location Specific Identifier") for each defined location which may be manually hard-coded based on geography. The location server or PAP may detect and forward detected mobile DSIs, along with the detected LSI, to a distant remote data server for reconciling the detected DSI with one or more device profiles. Each location server or PAP may cover an area of up to 70 m or more in radius. Multiple location servers or PAPs can be used in conjunction to provide coverage for larger areas.

Figure 2:
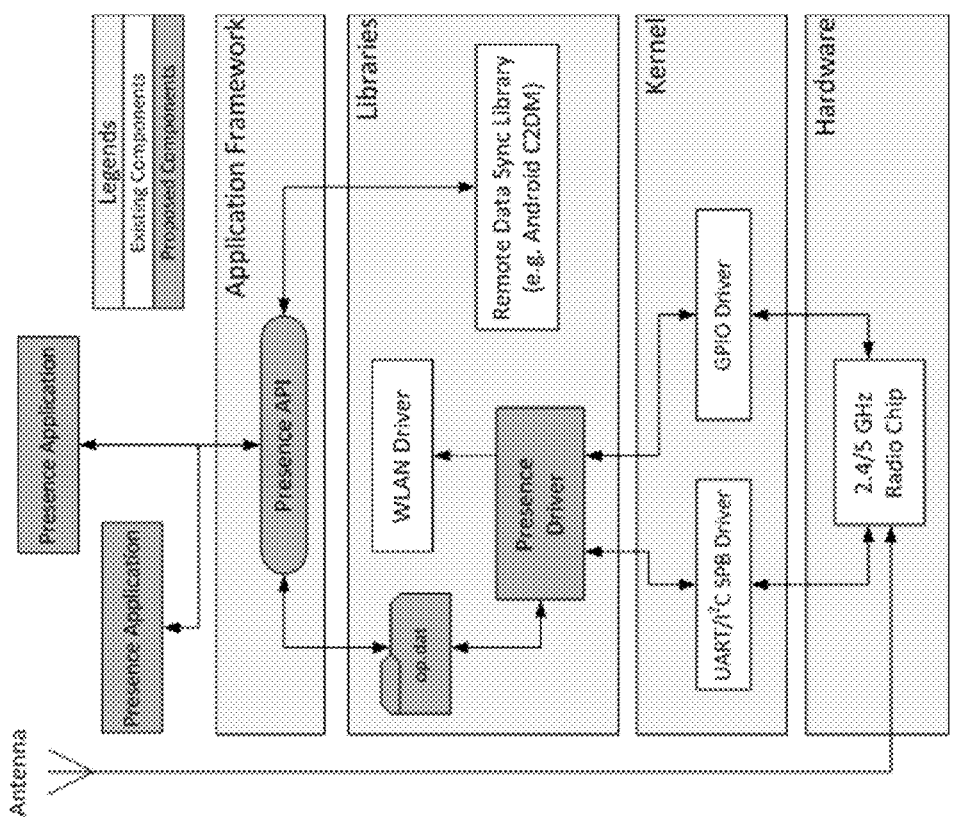
FIG. 2 depicts elements of the presence framework deployment on a mobile device, such as a personal mobile smart phone.

FIG. 2 depicts elements of a proposed presence deployment on a mobile device, such as a personal mobile smart phone. These elements may be configured into tiers including a presence application, an application framework, libraries, operating system kernel, and device hardware.

Figure 3:
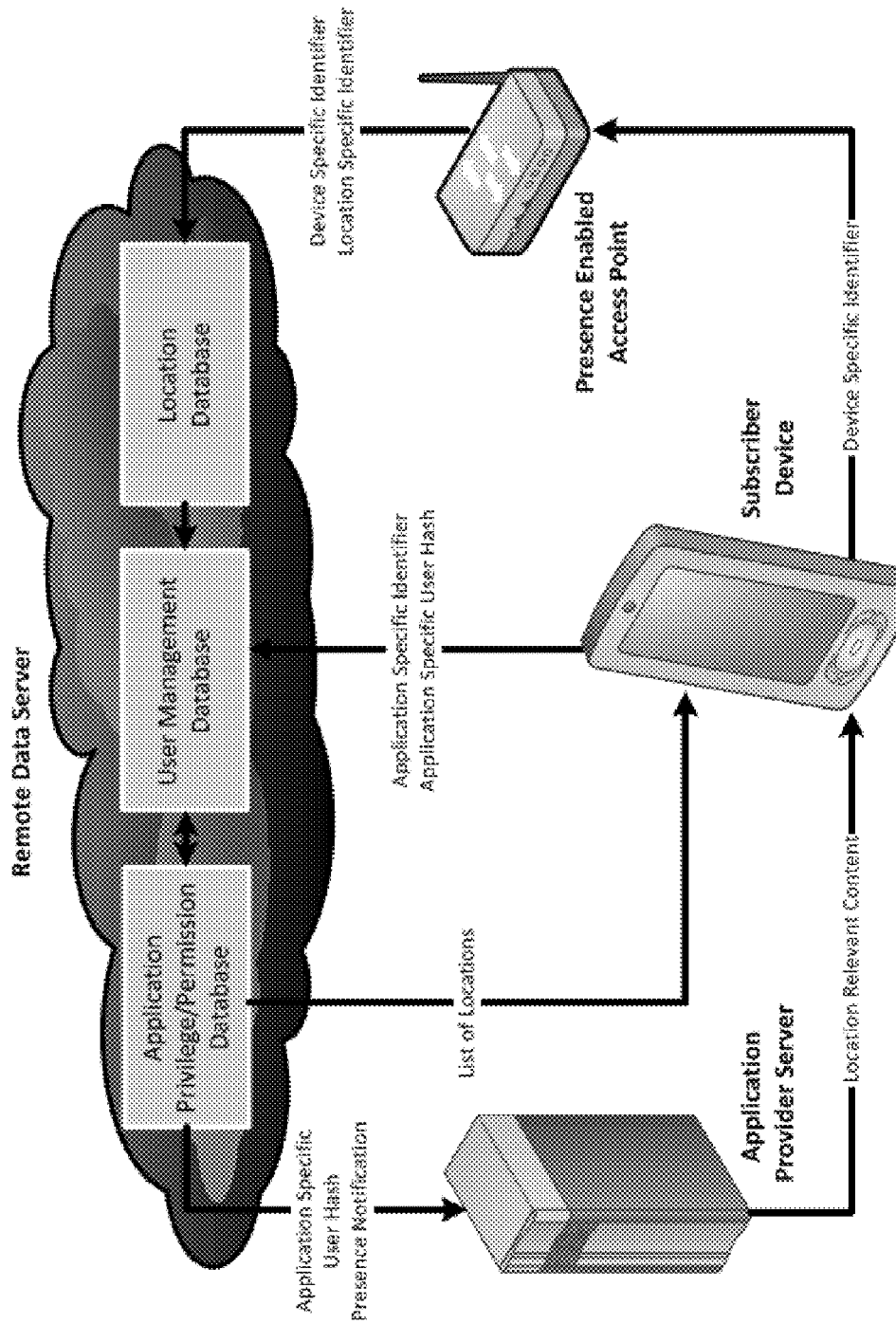
FIG. 3 depicts a remote data server for facilitating passive network-to-network transition techniques including reconciling a detected DSI with a device profile; a system that could be utilized through the proposed invention.

FIG. 3 depicts a remote data server (RDS) for facilitating passive network-to-network transition techniques described herein that may include reconciling a detected DSI with a device profile. The RDS may be a database server that may store and/or process all the DSIs, and the ASUHs linked to each DSI in a subscriber database. The RDS may forward the associated reconciled profile along with its location information (derived from the LSI) directly to an application provider server or to a presence application on the mobile device. The RDS may also remotely update an encryption key used to generate the DSI on the mobile device as described herein.

A presence framework may facilitate enabling mobile application developers to passively detect the presence of mobile users through the beaconing and passive detection technique described herein. An exemplary use of the Presence API may be to allow mobile application developers and advertisers to bring a smarter, more focused shopping experience to consumers while they are physically present in the retail environment.

The Presence API (PAPI) may be used by a third party application to retrieve an ASI ("Application Specific Identifier"), which is assigned when the third-party application registers on a remote data server (RDS). Once a subscriber accepts the application EULA ("End User License Agreement") the application may call the installation function on the PAPI and provides it with the ASI and the ASUH. The PAPI may then send this information along with the subscriber's mobile device DSI to the RDS. The PAPI may also update cached presence data on the subscriber phone with the information associated with the newly registered application and the locations from which it may be requesting or receiving presence data.

Each application may have its own opt-in requirements allowing a variety of different application providers to gain access to presence data for their desired locations through the proposed presence framework.

The Presence API (PAPI) may also be used upon application un-installation, or subsequent opt-out. The application may provide its ASI to the PAPI, which removes its data from the local subscriber phone cache and instructs the cloud server to remove the corresponding ASUH and ASI from the subscriber's database.

Figure 4:
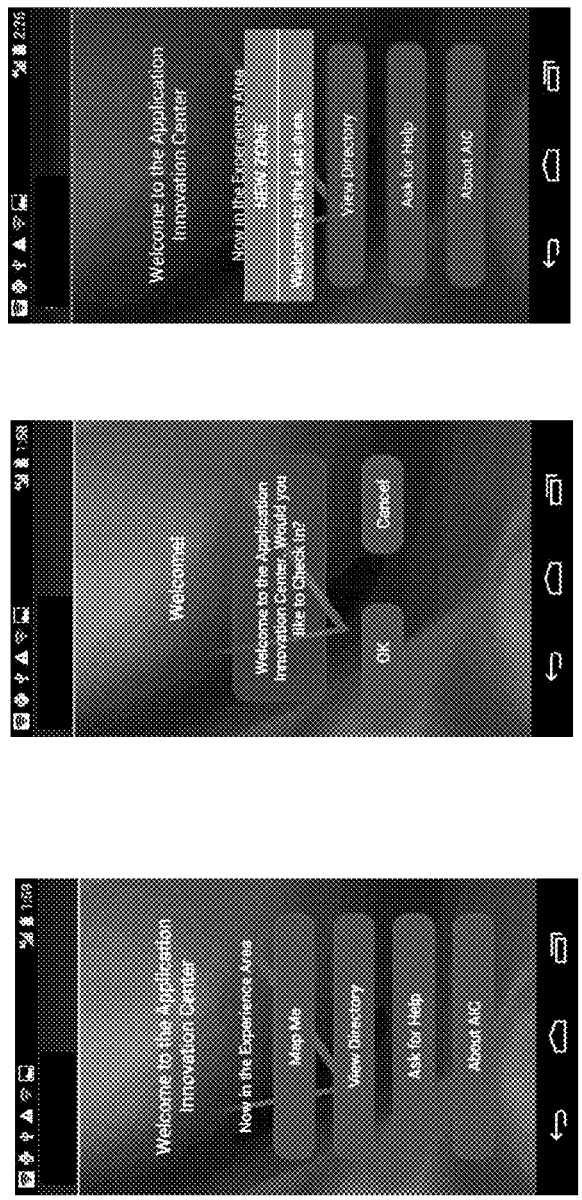
FIG. 4 depicts three exemplary welcome screens showing the use of the presence framework by an application developer to add location based features to a mobile application.

FIG. 4 depicts three exemplary presence aware welcome screens that could be used by an application developer to add location based features to a mobile application enabled by the presence framework.

Figure 5:
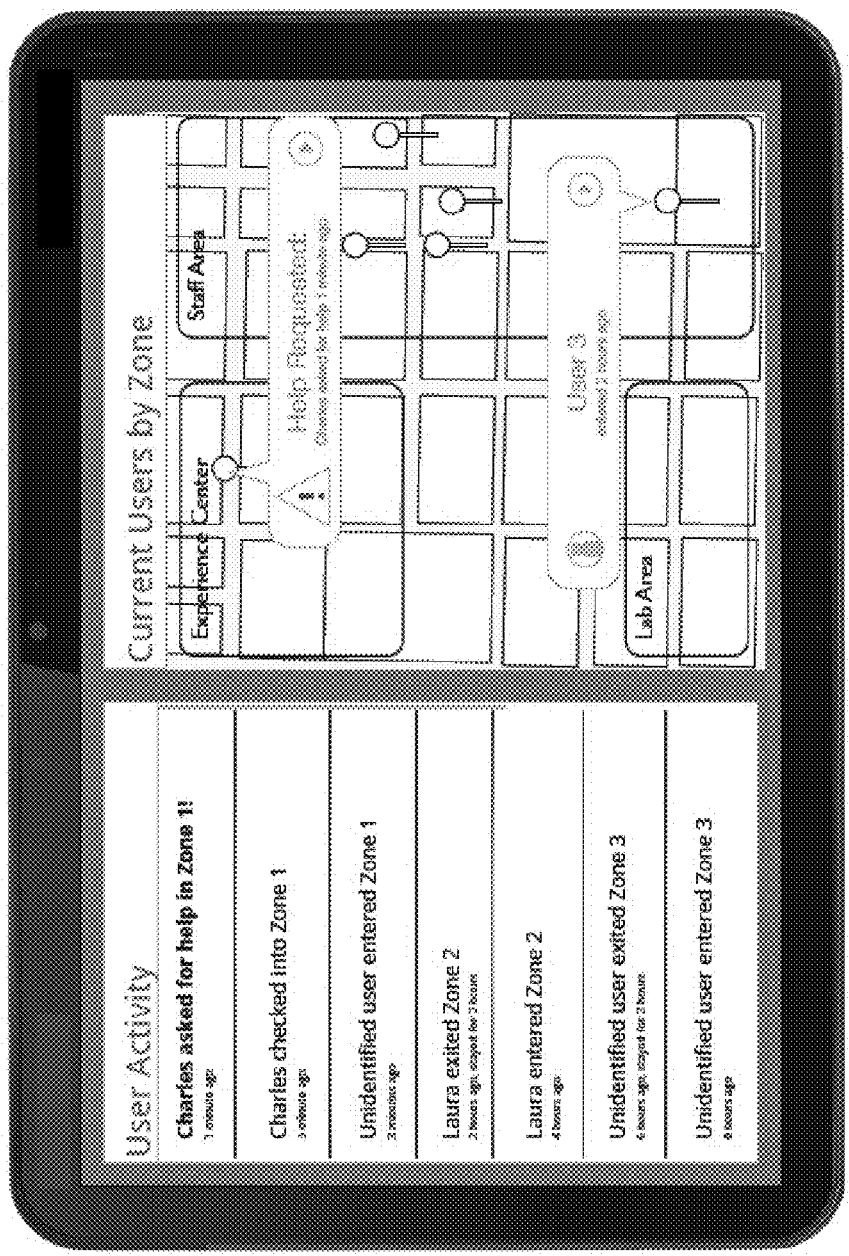
FIG. 5 depicts a screen of a web based application for providing visibility to user activity in a region of presence-detection zones enabled through the proposed invention.

FIG. 5 depicts a screen of a web based application for providing visibility to user activity in a region of presence enabled zones. The information captured to generate such a screen may be used to provide additional services enabled by presence awareness.

The methods and systems of a presence platform may include transformations of device specific MAC addresses for the purpose of providing additional security and avoiding public detection of device physical location (e.g. geolocation) including mobile devices, routers, and the like.

Figure 6:
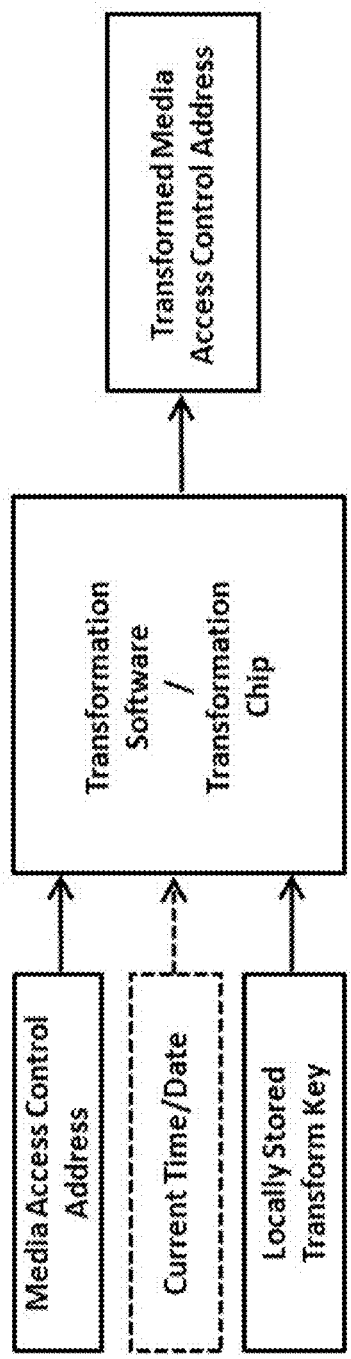
FIGS. 6 and 7 depict an example of a method of transformation of a MAC address and/or a DSI.
Figure 7:
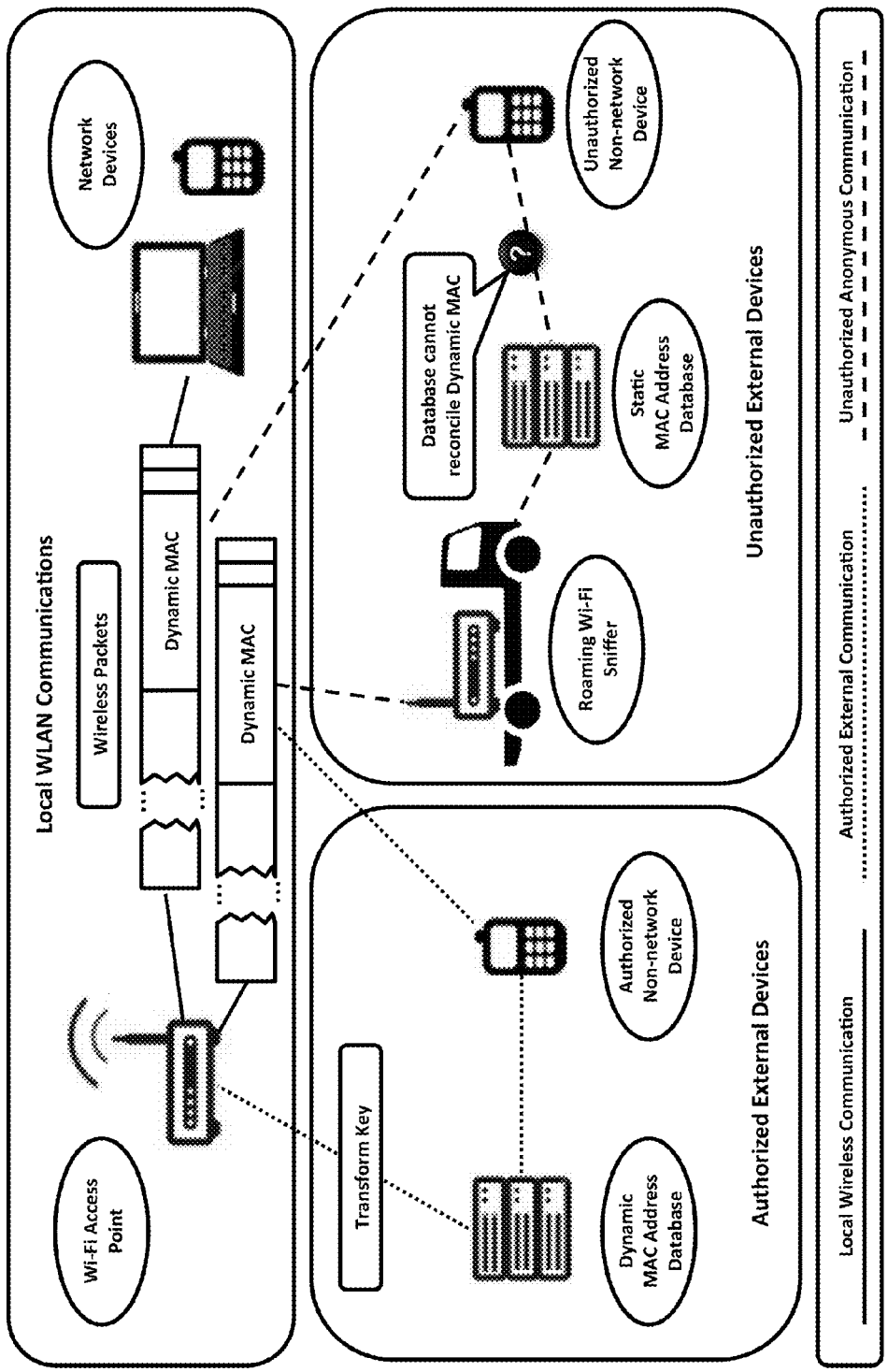

An example of a method of transformation of a MAC address and/or a DSI is described herein and depicted in FIGS. 6 and 7. In the method, a transformation key is supplied to the mobile device (e.g. to the radio chip, to a processor on the mobile device, and the like) which determines the transformed MAC address being broadcast. The key can be used to determine the transformation method from a variety of one to one transformation functions (e.g. preloaded on the chip hardware or firmware, downloaded over the network, and the like) or as a variable for transforming the MAC address, such as by a predetermined one to one transformation function such as a byte shift. By using time as a variable factor in a MAC address transformation function, the transformed MAC address can be changed regularly without having to update the transform key. The time factor can be synced with a scheduled DHCP refresh so that all connected devices may change to the new MAC address when it is generated. In an example, for a DHCP lease renewal cycle of 24 hours, the date can be used to generate the transformed MAC address.

Another example of generating a transformed MAC address of a mobile phone is to perform a shift of the MAC address data. In this example, a radio processor chip of a mobile phone may be loaded with a right to left byte shift operation corresponding to a first transform key, a left to right byte shift operation corresponding to a second transform key, a simple byte inversion corresponding to a third transform key, etc. The mobile phone can be set to refresh its DHCP table every hour, so the hour of the day would be a suitable MAC address transformation variable. If the device's MAC address is initially 01:23:45:67:89:AB (in hexadecimal), and the transform key is set to indicate right shifting, then from 01:00 to 01:59 the transformed MAC address will be B0:12:34:56:78:9A, from 02:00 to 02:59 it will be AB:01:23:45:67:89. This transformation can be done using either firmware on the chip or by using pre-defined logic gates on the chip, and the like. Incoming packets will have a reverse transformation, in this case if the key indicates a right to left byte shift, performed on the destination MAC address in the MAC header before being processed by MAC layer provided it is not a reserved MAC header for multicast.

By referencing a database of MAC addresses, the transformation key and current time, a radio chip vendor or other third party may be able to accurately reconcile the transformed MAC address being broadcasted to identify the network and its inherent properties. The transformed MAC address can also be used as a DSI to provide added functionality to the access point.

Figure 8:
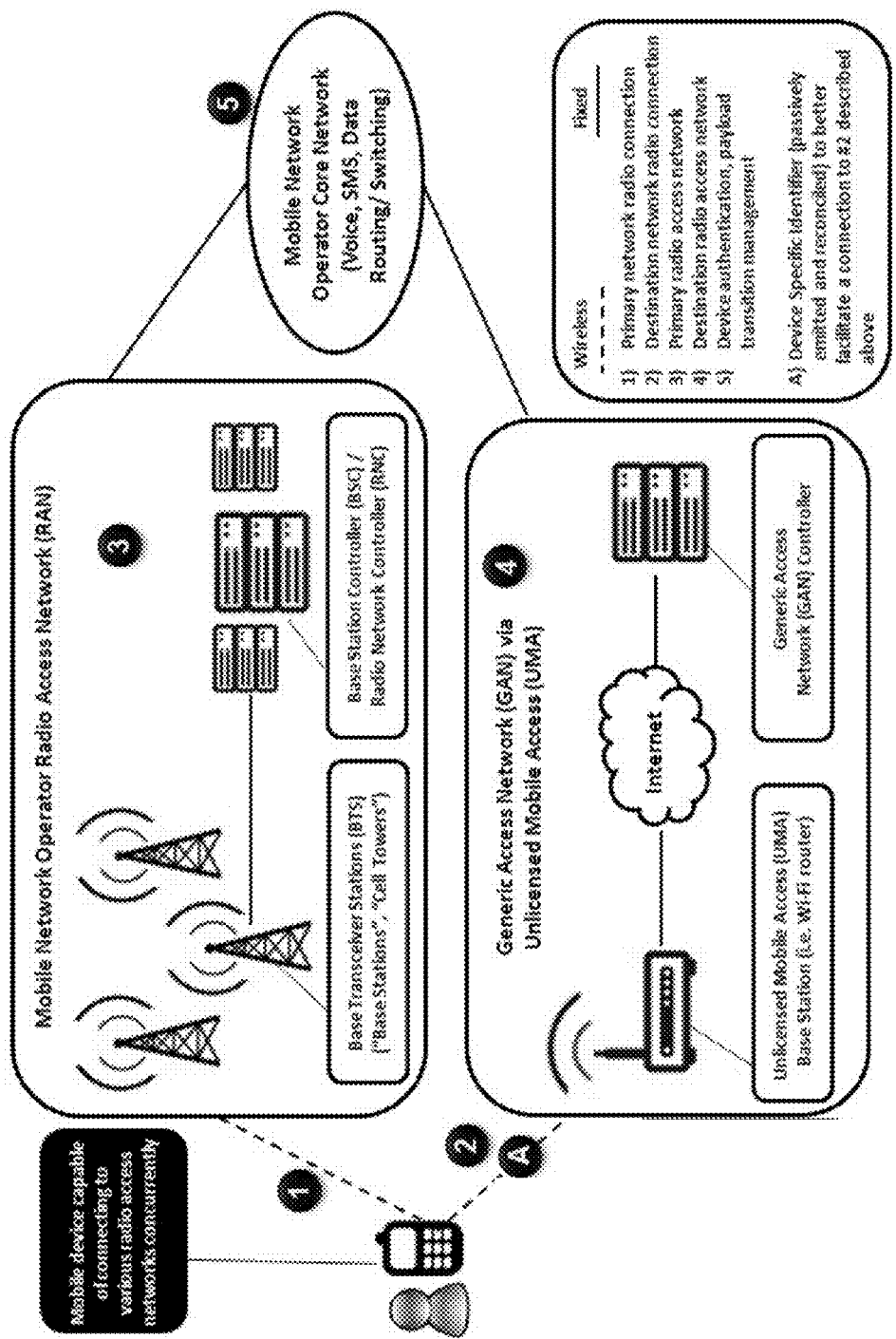
FIG. 8 depicts an embodiment of the presence framework provided by the invention.

FIG. 8 depicts an example of a deployment environment of the presence framework. The presence framework enables a user to seamlessly transition between two incongruent radio access networks by utilizing a device-specific identifier (DSI) which can authenticate the user on the Core Network operated by either the mobile carriers or their independent network operator partners. The DSI may be emitted by the mobile device of the user and passively absorbed by the Generic Access Network Controller to authenticate the user and facilitate a connection to destination radio access network without initial user input.

Figure 9:
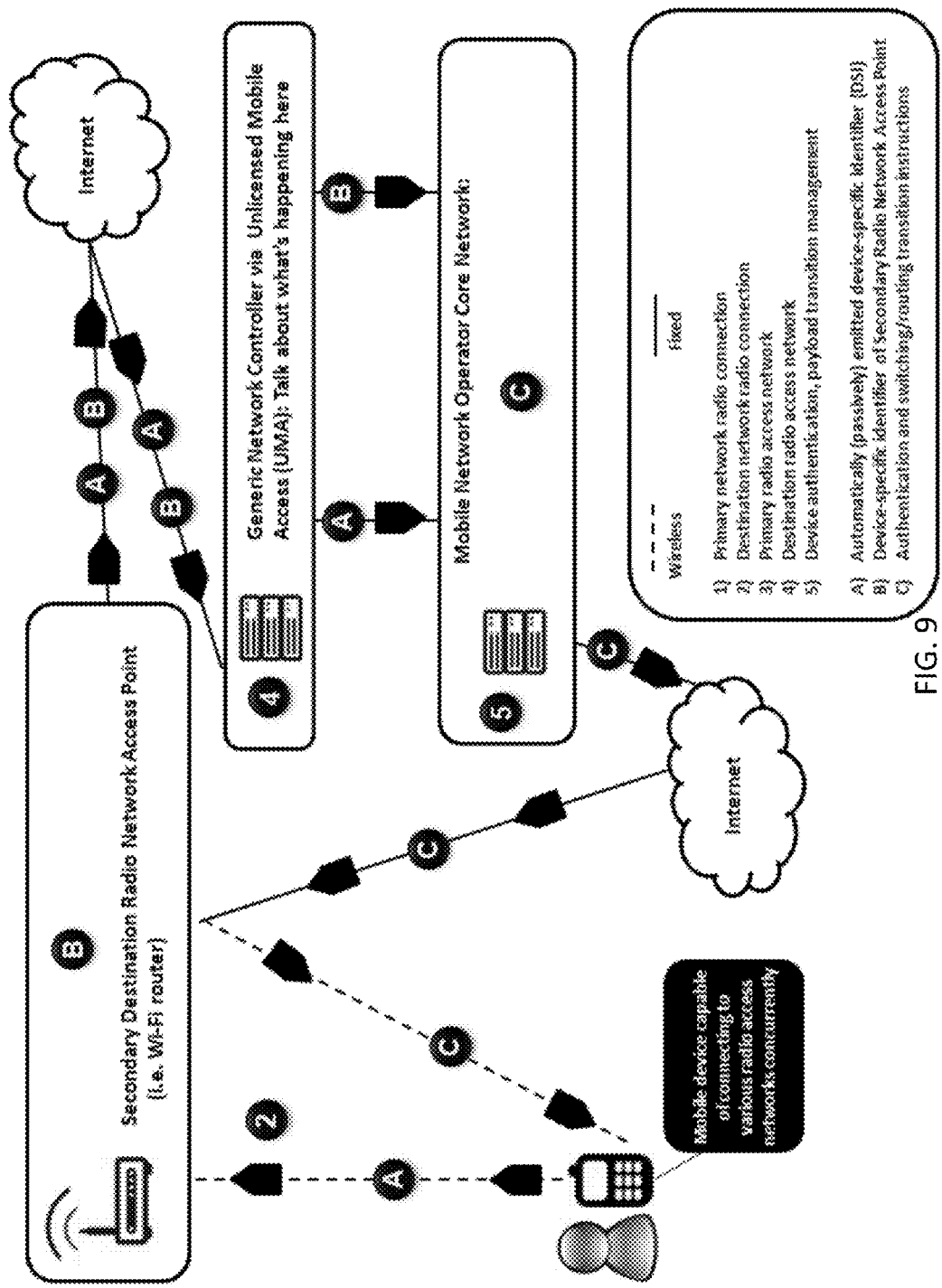
FIG. 9 depicts the detailed mechanics of the authentication of a user on the mobile network operator core network.

FIG. 9 depicts the detailed mechanics of the authentication of a user on the mobile network operator core network. As shown, the mobile device of the user automatically emits a unique device-specific identifier (DSI) that may be passively absorbed by a secondary and incongruent destination radio network access point (e.g. Wi-Fi router). The DSI of the user mobile device along with an identifier for the secondary destination radio network access point (e.g. Wi-Fi router) is passed on to a modified Generic Access Network Controller that can seamlessly absorb this information and then authenticate the user on the Mobile Network Operator Core Network.

Figure 10:
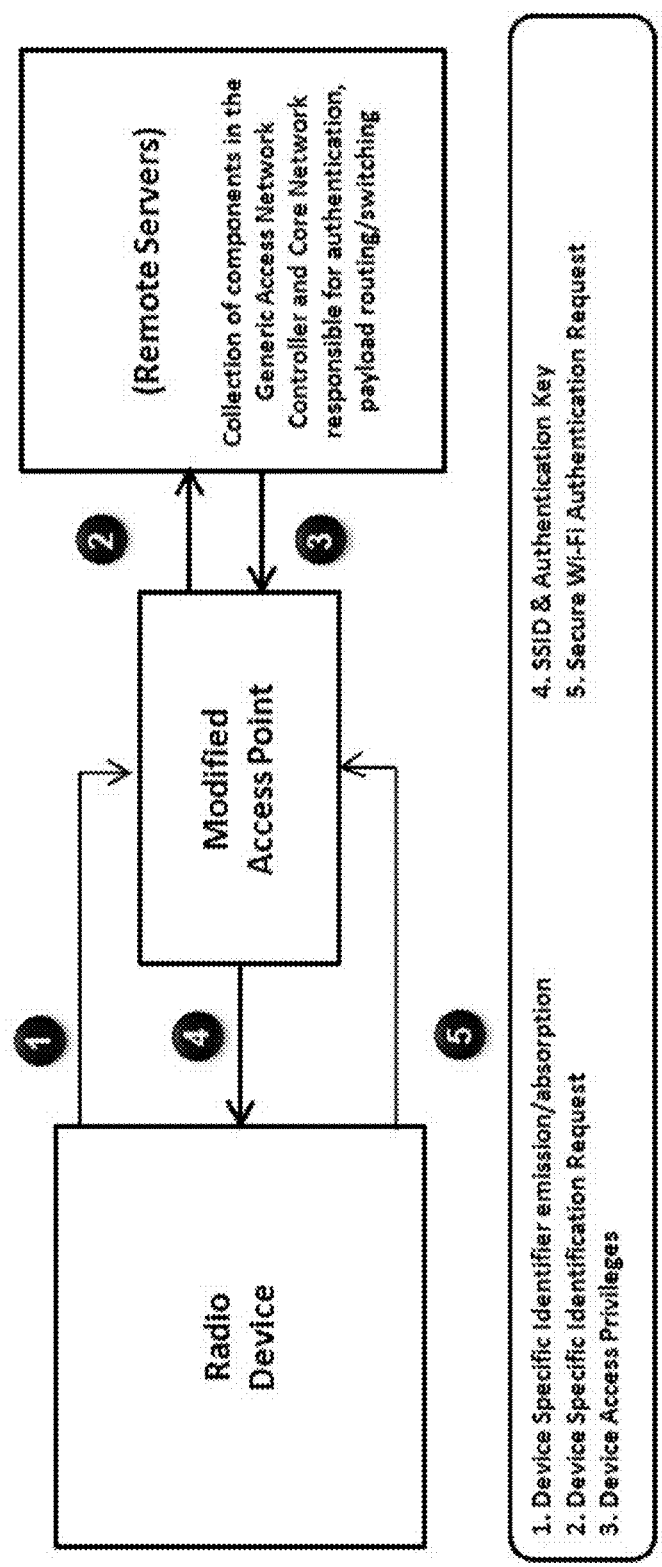
FIG. 10 shows the steps involved in the authentication of a radio device of a user by the presence framework provided by the invention.

FIG. 10 depicts the different steps involved in authentication of a radio device of a user by the presence system provided by the invention. A device-specific identifier emitted by the radio device is absorbed by the Presence Enabled Access Point. The device specific identification request is then sent to remote servers that include collection of components in the Generic Access network controller and Core network responsible for authentication and payload routing. The remote servers provide device access privileges. SSID and authentication key is then used to provide a secure Wi-Fi authentication.

An objective of the proposed methods and systems described herein is to first detect devices equipped with radio antennae (e.g. 2.4 GHz) as they come within a detectable proximity of one another and subsequently, to facilitate providers of data services (i.e. consumer application developers) with the means of passive authentication and/or service initiation mechanisms on the devices themselves and/or on remote devices/data stores. Described herein are the functions and services required by a presence enabled device to identify the device to other presence enabled devices. Also defined herein are example implementations of the various proprietary wireless frame formats needed to provide these services. This document also includes descriptions of the requirements and procedures to maintain user privacy. Also described herein are the techniques by which the proprietary presence protocol permits the operation of IEEE 802.11 compliant devices which coexist on overlapping IEEE 802.11 WLANs.

For the purposes of this document, the following terms and definitions apply.

Application Specific Identifier (ASI): A unique identifier assigned to each application partner once they have agreed to presence application developer's policies.

Application Specific User Hash (ASUH): A hash generated specifically for each application on an end user device to allow presence awareness to identify the user to the application provider.

Beacon Detection Area (BDA): The area within which two stations can successfully send and/or receive beacons between one another.

Beaconing Schedule Interval (BSI): The interval at which beacon frames are emitted from a PBS.

Device Specific Identifier (DSI): A unique 6 byte identifier used to identify each PBS.

Presence API (PAPI): Interface used by presence enabled applications to receive presence/location data.

Location Server (LS): A device equipped with a Presence Enabled Access Point that has its own Location Specific Identifier (designed for retail locations). This may be an existing Wi-Fi Access Point with the proposed presence invention residing in the form of software.

Location Specific Identifier (LSI): A unique identifier used to identify each location server.

Presence Enabled Access Point (PAP): A Wireless Local Area Network Access Point that functions as a Presence Detection Station.

Presence Beaconing Station (PBS): A station that has presence beaconing capabilities (usually an end-user device).

Remote Data Server (RDS): A remote database maintained as part of the presence framework that stores all DSIs, ASIs, ASUHs, LSIs and their permissions and relationships.

Presence Detection Station (PDS): Any station that has the capability to process presence beacons and transmit instructions to PBSs.

For the purposes of this document, the following abbreviations and acronyms apply.

AP Access Point
ASI Application Specific Identifier
ASUH Application Specific User Hash
BDA Beacon Detection Area
BSI Beaconing Schedule Interval
BSS Basic Service Set
CRC Cyclic Redundancy Code
DBS Decrease Beaconing Schedule
DSI Device Specific Identifier
EAS Emergency Alert System
EBF Emergency Beacon Function
ERF Emergency Response Function
FCS Frame Check Sequence
LLC Logical Link Control
LS Location Server
LSI Location Specific Identifier
MAC Medium Access Control
NAV Network Allocation Vector
PAP Presence Enabled Access Point
PAPI Presence Application Interface
PBS Presence Beaconing Station
PDS Presence Detection Station
PHY Physical Layer
RDS Remote Data Server
SIFS Short Interframe Space
SSID Service Set Identifier
STA Station
TSR Time Stamp Request
WEP Wired Equivalent Privacy
WLAN Wireless Local Area Network
WPA WLAN Protected Access The proposed proprietary presence wireless protocol has fundamental characteristics that distinguish it from existing wireless communication protocols, leveraging the 2.4 GHz or 5 GHz unlicensed spectrum such as Bluetooth® and IEEE 802.11 (marketed as Wi-Fi). The proposed invention and protocol utilize a very similar physical framework as IEEE 802.11 and as a result, the proposed protocol meets the various regulatory requirements (i.e. FCC) imposed on radio transmissions.

Presence beacon frames directed to Presence Detection Stations (PDSs) may use a destination independent address (e.g. 00:00:00:00:00:00). This allows normal WLAN APs to ignore transmissions, while allowing any PDS with a different address to receive and process the same packet for reconciliation without and prior to any handshake between the two devices.

Presence frames may support device-to-device (e.g. station-to-station) detection. The proposed presence protocol may not require a Basic Service Set (BSS) to be established for it to function. This allows presence enabled devices to work without a handshaking process and establishing a subsequent data transmission connection such as connections or associations made by Wi-Fi, Bluetooth, or any other device-to-device data transmission protocol.

The proposed presence protocol also may not require any acknowledgement frames to check for successful data transmission. Since presence beacon frames transmitted by a Presence Beaconing Station (PBS) are not picked up by a PDS when outside of a Beacon Detection Area (BDA), requiring an acknowledgement frame would cause the PBS to transmit repeatedly in certain situations. The protocol instead relies on a shorter Beaconing Schedule Interval (BSI) when inside a BDA to make up for the possible loss of packets.

The proposed presence protocol will not use either the Bluetooth frequency hopping schemes to avoid interference or implement the complex Carrier Sense Multiple Access/Collision Avoidance (CSMA/CA) schemes for IEEE 802.11 that are necessary for contention. Instead, to avoid interfering with existing traffic on the 2.4 GHz or 5 GHz frequencies, presence devices may rely on a more fundamental 1-persistent CSMA mode with no Collision Detection/Avoidance.

The presence framework architecture consists of several components that interact to provide a platform for presence detection and/or authentication. The PBS persistently emits beacon frames and when it enters a BDA the beacon frames are absorbed by a PDS. The PDS uses instructions it receives from the beacon frame and reconciles the received information in various processes. An overview of such reconciliation is provided here for informative purposes. The PDS may send instructions to the PBS to affect its transmission behavior. It may also transmit information to authenticate services on the PBS.

In an example of a beacon frame instruction reconciliation process, a multi-layer user reconciliation process may be leveraged by the presence framework to protect a user's identity and to ensure that privacy is maintained when sharing user information. The presence framework uses two different layers of identification each with a different set of identifiers; an application layer and a machine-to-machine layer.

Figure 11:
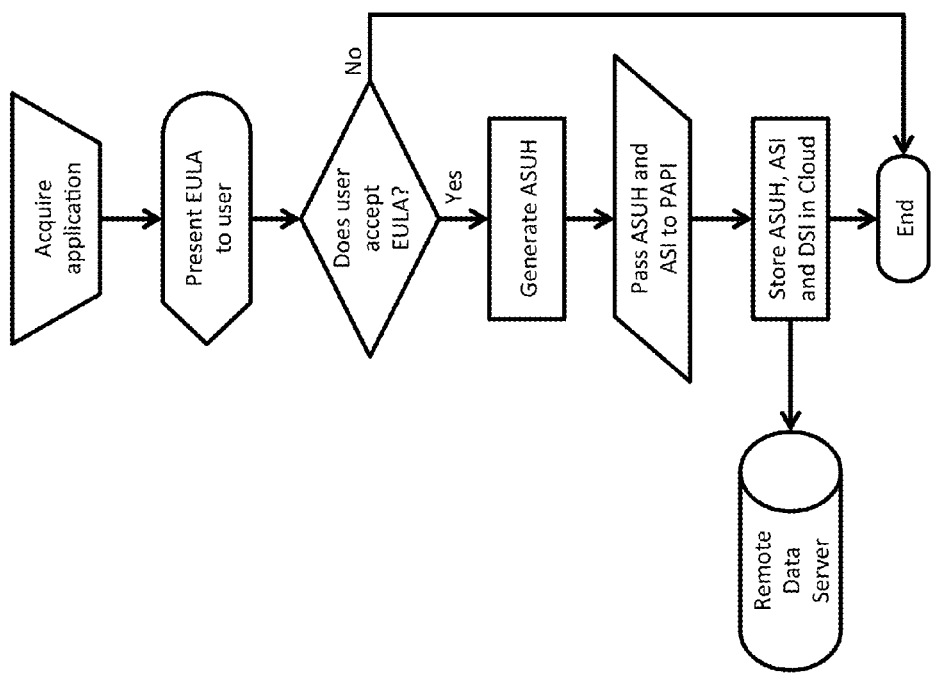
FIG. 11 depicts exemplary steps for installing a presence enabled application.

FIG. 11 depicts exemplary steps for installing a presence enabled application. An application layer interface called Presence API (PAPI) allows applications leveraging presence capabilities to uniquely identify each user to the application provider by generating an identifier called the Application Specific User Hash (ASUH). Each application partner generates their own ASUH when the application is first installed and it is shared between the presence framework components and the application provider only. Each application provider is also provided with a unique identifier called Application Specific Identifier (ASI) that identifies them within the presence framework system. The proposed methods and systems also facilitate allowing all application partners to inform the user of the locations that they are requesting presence data for in their EULAs and subsequently this information can also be viewed and granularly adjusted in the presence settings.

A separate machine-to-machine layer interface uses the Device Specific Interface (DSI) to uniquely identify each presence enabled device. The DSI may be a derivative of the MAC Address in devices with unique MAC addresses. For devices in which the MAC Address is not unique, a DSI is generated separately, such as through one or more of the MAC Address transformation techniques described herein, and assigned to the device. The DSI is known only within the presence framework system and is not shared with other entities or associated with any user data. The DSI is a part of all beacon frames transmitted by a PBS. Importantly, if the DSI were to be absorbed by an unauthorized entity, it cannot be reconciled with any user information or identity.

Figure 12:
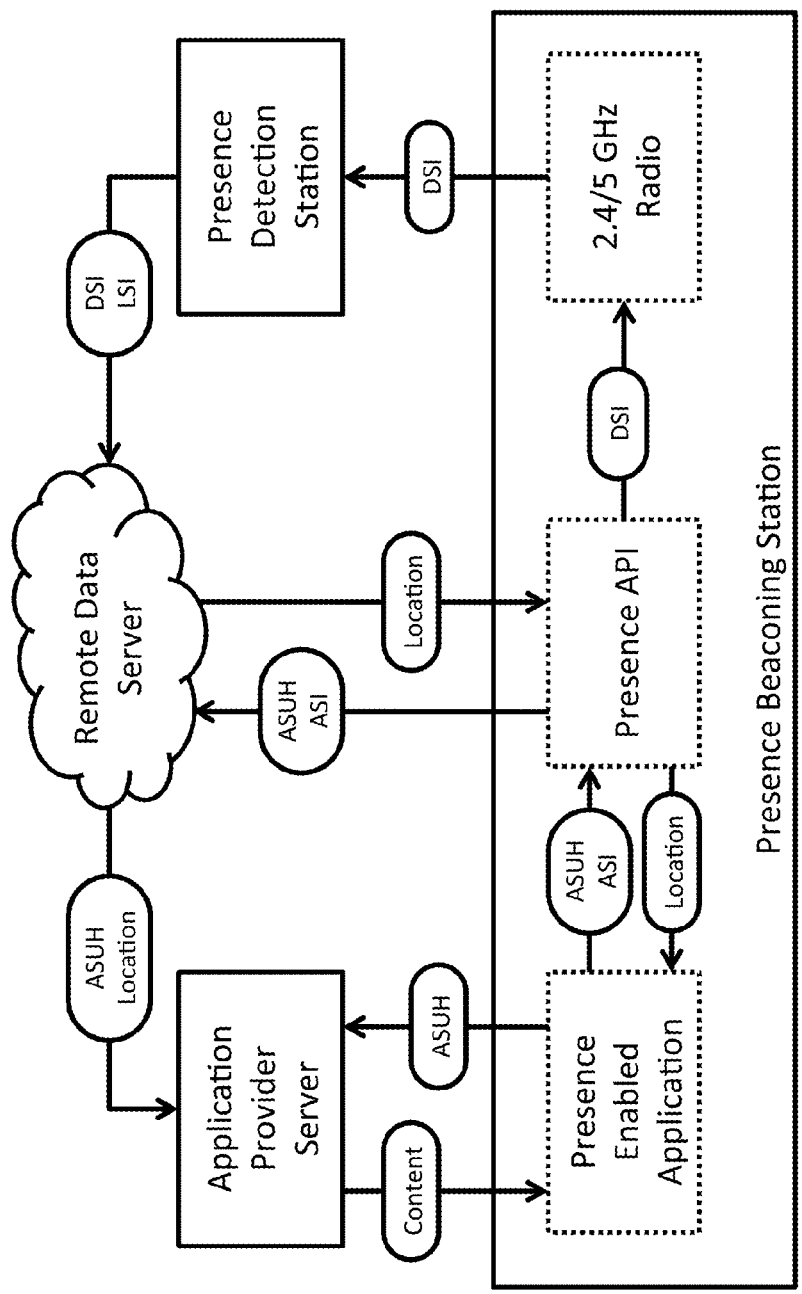
FIG. 12 depicts the exchange of identifiers in the reconciliation process.

FIG. 12 depicts the exchange of identifiers in the reconciliation process. The DSI is emitted by the Presence Beaconing Station (PBS) as part of its beacons. The PDS absorbs the DSI from the beacon frame and subsequently relays it to the Remote Data Server (RDS) for processing. The RDS queries the DSI and determines which application partners have been approved by the user to receive presence/location data for the detection site. The application partners who are determined to have access at the site are then sent their respective ASUHs with which they can identify the user.

The beacon frames sent out by the PBS are only detected when the transmissions occur within a BDA. Once the PBS leaves the BDA, its beacon frames are no longer picked up by a PDS, at which point it stops receiving instructions from the PDS and switches to the default power conservation transmission mode with a longer Beaconing Schedule Interval (BSI).

Specialized beacon frames may be sent out by Presence Enabled APs (PAPs) to allow passive authentication of a core WLAN connection. PAPs can authenticate a PBS and pass hidden SSIDs and WEP/WPA/WPA2 keys directly to the PBS. This information is used to trigger an association request from the PBS. A more detailed description of an exemplary implementation is shown in the following example.

We now describe exemplary methods used to provide passive WLAN authentication and connection capabilities to a Presence Beaconing Station (PBS) once it has been identified or circumvent authentication altogether in the case of an emergency.

Presence Enabled Access Points (PAPs) are WLAN Access Points (APs) that also act as Presence Detection Stations (PDSs) when equipped with the proposed invention in the form of software that resides in the hardware already in the WLAN Access Point. PAPs have added functionality in that they can enable access to a wider range of services compared to a stand-alone PDS which may only detects presence.

Figure 13:
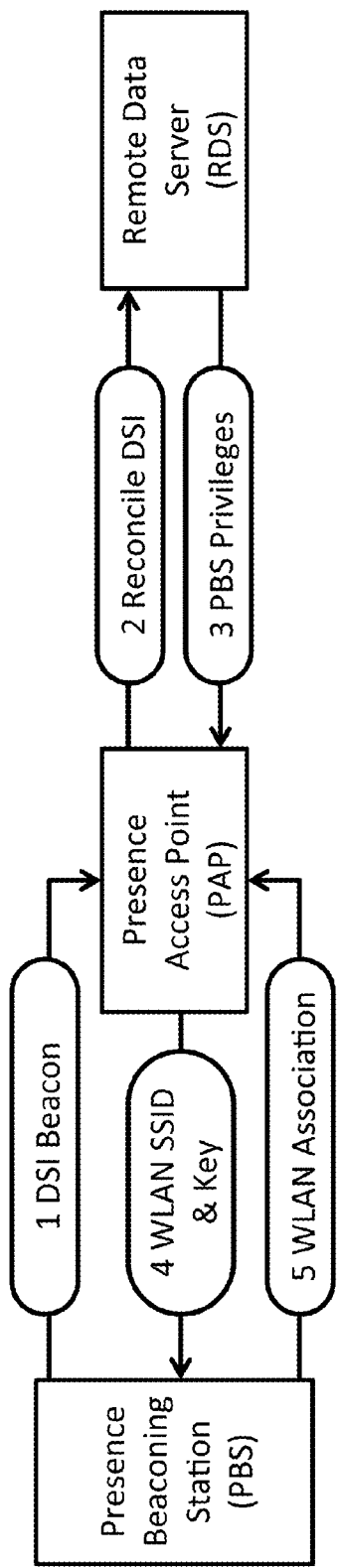
FIG. 13 shows an exemplary method used to provide passive WLAN authentication and connection capabilities to a Presence Beaconing Station once it has been identified.

When a PAP detects a new PBS in its Beacon Detection Area (BDA), it first reconciles the user information as a normal PDS as described herein. Additionally if the user has access privileges to the WLAN provided by the PAP, the PAP is given instructions and an encryption key from the cloud server to provide WLAN authentication information to the PBS. The PAP encrypts the SSID and the WLAN key using the key and beacons this information to the PBS. A software client on the PBS can decrypt the SSID and WLAN key and use them to passively authenticate and connect to the WLAN provided by the PAP. These steps are outlined in FIG. 13.

Figure 14:
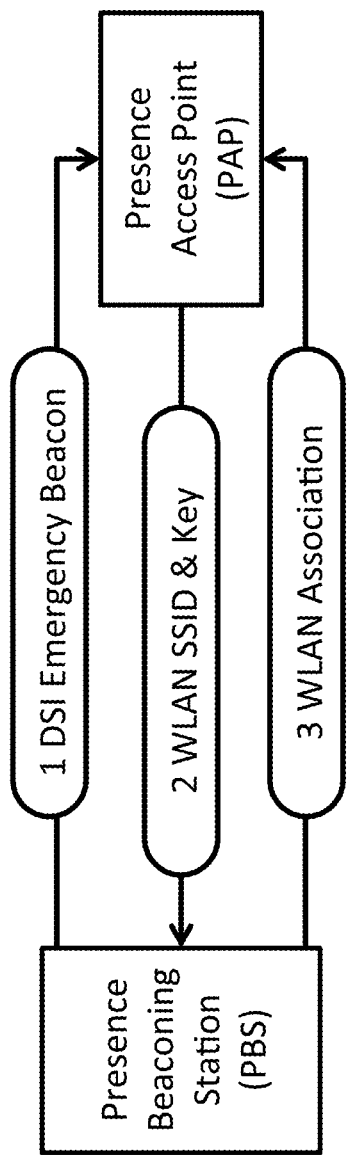
FIG. 14 shows an exemplary method used to provide passive WLAN Emergency Alert System (EAS) authentication in the case of an emergency.

In case of an emergency beacon being detected by a PAP, the PAP automatically sends the SSID and WLAN key to the PBS without waiting for the reconciliation process through the cloud. These steps involved are outlined in FIG. 14.

The proposed proprietary protocol defines services that are required for the protocol to function but may not require a specific implementation of said services. The PBS and PDS have distinct sets of functionalities and are responsible for either initiating and/or executing certain services. The PBS is not required to implement the services for the PDS and the PDS is not required to implement the services for the PBS.

The services implemented on the PBS that may be triggered by the PDS comprise:
 Increase Beacon Frequency
 Enable WLAN Access The services implemented on the PBS, triggered locally are:
 Emit DSI Beacon
 Emit DSI+Time Stamp Beacon
 Emit DSI+EAS Beacon The services implemented on the PDS are:
 Reconcile PBS Beacon Frames
 Emit DBS Beacon
 Emit TSR Beacon
 Emit WLAN Parameter Beacon (only on PAPs)

An PBS generates services that may affect the overall behavior of the presence architecture.

The PBS emits the beacon frame at a fixed interval determined by the BSI. Once the beacon frames are absorbed, the PDS can initiate other services.

If time stamping is enabled the PBS transmits the beacon frame along with the time elapsed to the nearest 1.25 nanoseconds from the previous beacon.

If the PBS has Emergency Alert System (EAS) activated, it may emit a priority beacon frame. When the PDS receives the priority beacon frame it processes and reconciles the information pushing all other non priority beacon frames into a buffer while the priority beacon frame is processed. The priority beacon frame may override all user privacy settings and start gathering presence information and allow access to services which may or may not be provided under normal conditions.

When the PDS first detects an PBS in its BDA, it can direct the PBS to decrease its BSI for a set amount of time. If the PBS remains in the BDA past the time limit, it may be redirected to maintain the increased frequency. Once the PBS leaves the BDA, it may automatically revert to its default BSI in the absence of beacon frames from the PDS.

A PAP can be directed to enable WLAN access on the PBS. The PBS is given the SSID and/or an encrypted key needed to establish a WLAN connection. Upon receiving WLAN Access information, the PBS passes the information to a software client. The software client can subsequently use this information to establish a WLAN connection.

The PBS may be instructed by the PDS of whether or not time stamping is required for the BDA. If they are, the PBS may emit a DSI+TSR ("Time Stamp Request") Beacon instead of the regular DSI beacon. All PDSs that support time stamping for signal analysis may broadcast a TSR beacon frame when the PBS first enters the BDA and at regular intervals afterwards. In the absence of this TSR beacon frame the PBS may stop time stamping its beacons.

When a PDS receives a beacon frame from the PBS, it may need to route the information to the Remote Data Server (RDS). The PDS may monitor the signal strength of the incoming beacon frames and only route PBS data once it passes a threshold value. Importantly, the PDS may also reconcile beacon frames depending on their priority and the order they are received in. EAS beacon frames have the highest priority and are routed on priority channels.

The PDS may cache PBS information once the PBS enters its BDA. When an PBS is first detected, the PDS may emit a beacon frame that, once received by the PBS, will decrease the BSI of the PBS causing the PBS to emit beacon frames at smaller intervals. The PDS may maintain a scheduling algorithm and emit a beacon frame to notify the PBSs that they are within its BDA.

If a BDA is equipped to provide added functionality by processing time stamp information for signal analysis, it may send out an additional beacon frame called the TSR beacon. This beacon notifies a PBS that it needs beacons to be time stamped. The PDS may need to send out this beacon frame when a PBS is first detected and also at regular intervals afterwards as in the absence of this beacon frame, a PBS may stop time stamping its beacons.

PAPs have WLAN capabilities, and can send information needed to connect to the core WLAN network. Once the PAP has detected and reconciled the PBS, it may emit a beacon frame containing the SSID and WLAN authentication key when directed by the RDS. The PAP may also locally default to send this information out to a PBS, if the PBS is emitting a priority emergency beacon frame.

The formats of the presence frames are now described. A Station (STA) should be able to properly construct a subset of the frames and decode a different subset of the frames specified. The sets may be determined by whether the STA is a Presence Beaconing Station (PBS) or Presence Detection Station (PDS). All STAs should be able to validate every received frame using the frame check sequence (FCS) and to interpret certain fields from the frame headers.

Each frame consists of the following basic components:
A header, which compromises frame control and duration.
A variable length frame body which contains information specific to the frame type.
A FCS, which contains an IEEE 32-bit CRC.

The frames are described as a sequence of fields in a predefined order. Each figure in Section 5 depicts the fields as they appear in the frames in the order in which they are to be emitting from the physical layer, from left to right.

All bits within fields are numbered, from 0 to k, where the length of the field is k+1 bits. The octet boundaries within a field can be obtained by taking the bit numbers of the field modulo 8. Octets within numeric fields that are longer than a single octet are depicted in increasing order of significance, from lowest numbered bit to highest numbered bit. The octets in fields longer than a single octet are sent to the physical layer in order from the octet containing the lowest numbered bits to the octet containing the highest numbered bit. Any field containing a Cyclic Redundancy Code (CRC) is an exception to this convention and is transmitted commencing with the coefficient of the highest-order term.

Figure 15:
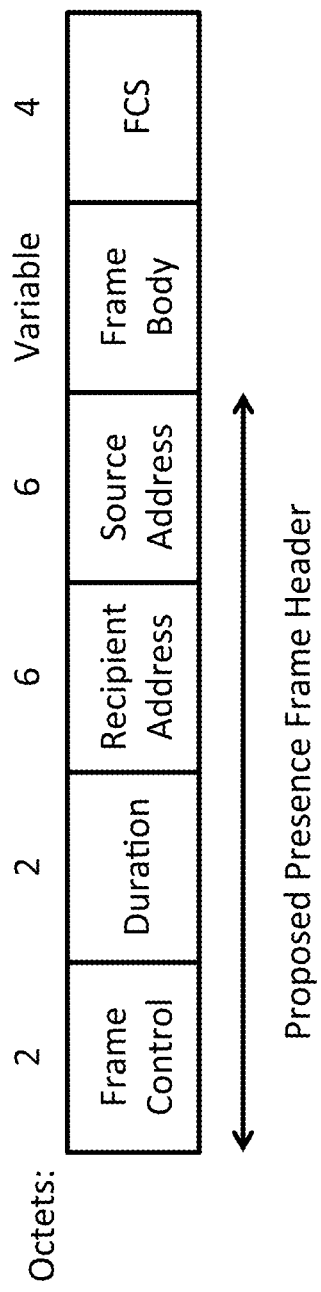
FIG. 15 depicts a proposed format of the Presence Frame.

The proposed presence frame format comprises a set of fields that occur in a fixed order in all frames. FIG. 15 depicts the general presence frame format. The first three fields (Frame Control, Duration/ID, and Recipient Address) and the last field (FCS) in FIG. 15 constitute the minimal frame format and are present in all frames. The fields Source Address and Frame Body are present only in certain frame types. The Frame body is of variable size depending on frame type.

Figure 16:
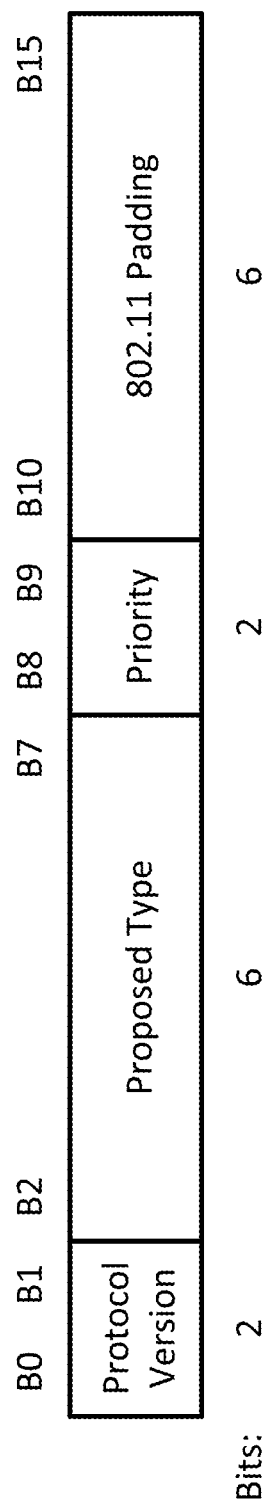
FIG. 16 depicts a proposed format of Frame Control Field in the Presence Frame Format.

The Frame Control field consists of the following subfields: Protocol Version, Type, Priority, and WLAN Related Flags. The format of the Frame Control field is illustrated in FIG. 16.

The Protocol Version field is 2 bits in length and is invariant in size and placement across all revisions of this standard. It also reflects the Protocol Version of the 802.11 standard supported by the same radio. The version level may only be incremented once the version level of 802.11 Protocols are increased to allow cross compatibility of standards across multiple devices. Any received frames with a higher revision level should discard the frame without any indication to the STA or to Logical Link Control (LLC).

The Type field is 6 bits in length. The type fields identify the function of the frame. There are two frame types: beacon and control. Each of these frame types has several defined subtypes. Table 1 defines the combinations for each subtype. (The numeric values in Table 1 are shown in binary).

TABLE 1

Valid Type Combinations

| Type Value b7 b6 b5 b4 b3 b2 | Type Description | Subtype Description |
|---|---|---|
| 000011 | Beacon | DSI |
| 000111 | Beacon | DSI + Time Stamp |
| 010011 | Beacon | WLAN SSID + key |
| 110011 | Control | Decrease Beaconing Schedule (DBS) |
| 110111 | Control | TSR Mode (BDA needs time stamped beacons) |

Bit 7 is set to 0 in beacon frames and to 1 in Control frames. Bit 6 is set to 0 in frames originating from a PBS and to 1 in frames originating from a PDS.

The priority fields can be set to prioritize the order in which beacon frames are processed at either the (Medium Access Control) MAC or higher layers. Beacons of the same priority level are processed in a first-in, first-out basis, and higher priority levels are always cleared before lower levels. The combination of values and corresponding priority levels are define in table 2.

TABLE 2

Priority Field Values for Beacon Frames

| Priority Value b9 b8 | Priority Level | Subtype Description |
|---|---|---|
| 00 | None | Normal Beacons |
| 01 | Low | Beacons from PBS with no network connection |
| 10 | Medium | Reserved |
| 11 | High | Beacons from PBS with EAS activated |

The proposed presence header has 6 additional bits added to make it the same length as the Frame Control field specified in IEEE 802.11 MAC Header. Bits 10, 11, 13, 14 and 15 (More Fragment, Retry, More Data, Protected Frame and Order in IEEE 802.11) are all set to 0. Bit 12 (Power Management in IEEE 802.11) is set to 0 from all PDSs, but set to 1 from all PBSs.

The Duration field is 16 bits in length. The duration value is used to update the Network Allocation Vector (NAV) according to the procedures defined in clause 9.2.5.4 of IEEE 802.11. The Duration field is set to the amount of time needed in microseconds to send the entire frame. Since the proposed protocol has transmissions that are at most only one frame long it will not require a device to reserve a longer time limit.

Each Address Field contains a 48-bit address that acts as an identifier for the device. All PDSs use 00:00:00:00:00:00 (in hexadecimal) as their address while the address of a PBS called DSI is determined by additional software in the application layer of the device.

The Frame Body is a variable length field that contains additional information specific to certain frame types. The minimum frame body is 0 octets as not all types need to broadcast additional information.

The FCS field is a 32-bit field containing a 32-bit CRC. The FCS is calculated over all the fields of the proposed presence header and the Frame Body field. The FCS calculation is same as the one specified in IEEE 802.11.

The FCS is calculated using the following standard generator polynomial of degree 32:
$$G(x)=x^{32}+x^{26}+x^{23}+x^{22}+x^{16}+x^{12}+x^{11}+x^{10}+x^8+x^7+x^5+x^4+x^2+x+1$$

The FCS is the ones complement of the sum (modulo 2) of the following:

The remainder of $x^k \times (x^{31}+x^{30}+x^{29}+\ldots+x^2+x+1)$ divided (modulo 2) by G(x), where k is the number of bits in the calculation fields, and The remainder after multiplication of the contents (treated as a polynomial) of the calculation fields by x32 and then division by G(x).

The FCS field is transmitted commencing with the coefficient of the highest-order term.

As a typical implementation, at the transmitter, the initial remainder of the division is preset to all ones and is then modified by division of the calculation fields by the generator polynomial G(x). The ones complement of this remainder is transmitted, with the highest-order bit first, as the FCS field.

At the receiver, the initial remainder is preset to all ones and the serial incoming bits of the calculation fields and FCS, when divided by G(x), results in the absence of transmission errors, in a unique nonzero remainder value. The unique remainder value is the polynomial:

$x^{31}+x^{30}+x^{26}+x^{25}+x^{24}+x^{18}+x^{15}+x^{14}+x^{12}+x^{11}+x^{10}+x^8+x^6+x^5+x^4x^3+x+1$

Figure 17:
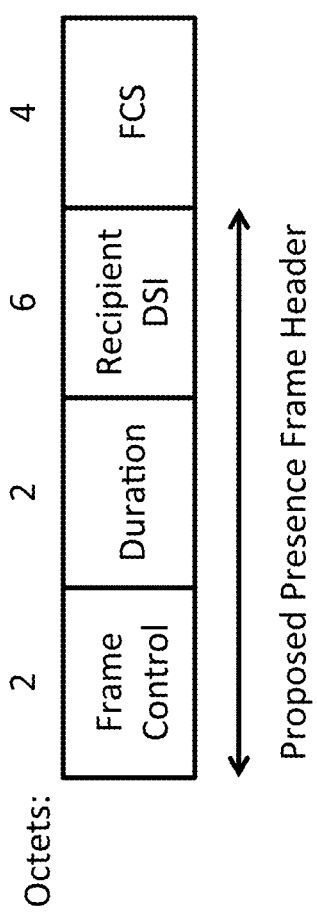
FIG. 17 depicts a proposed frame format for Presence Control frames.

The frame format for control frames is independent of frame subtype and is defined in FIG. 17. The recipient address is set to the DSI of the destination device. The duration field is set to the time interval needed to transmit the pending frame plus one Short Interframe Space (SIFS) interval.

Figure 18:
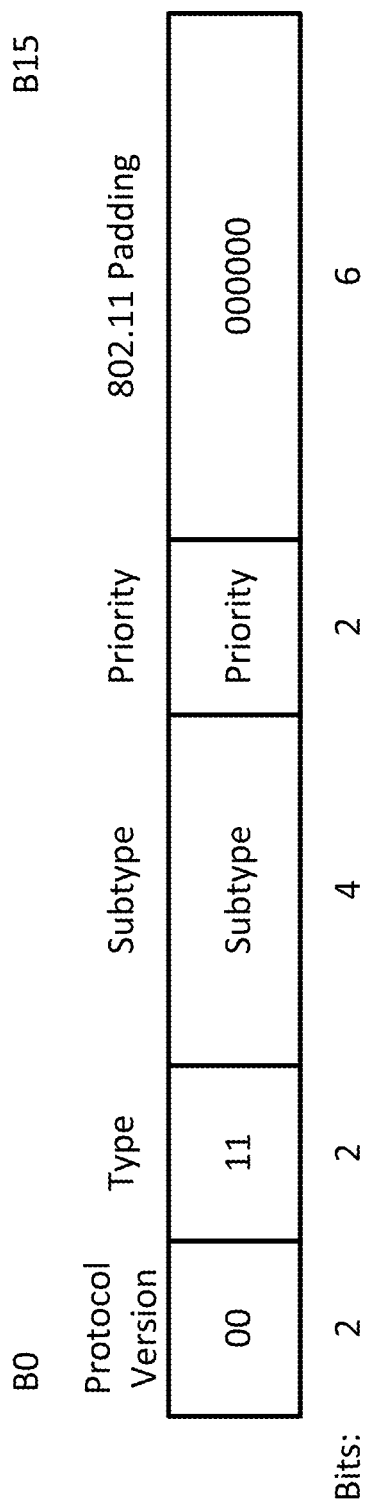
FIG. 18 illustrates the subfields within the Frame Control field of Presence Control frames.

The subfields within the Frame Control field of control frames are set as illustrated in FIG. 18.

Figure 19:
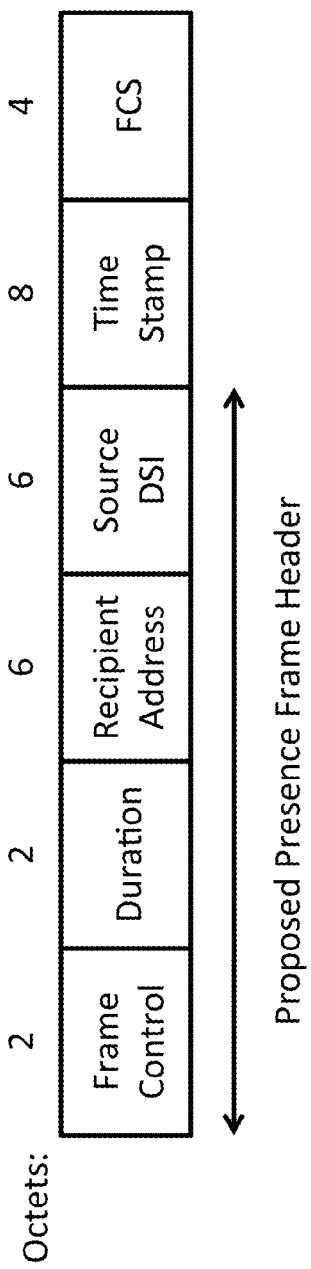
FIG. 19 shows a proposed frame format for DSI Beacon Frame.

The frame format for the DSI Beacon frame is defined in FIG. 19.

The recipient address is set to 0xFFFFFFFFFFFF (in hexadecimal) and the source DSI is the DSI of the transmitting device. The duration field is set to the time required to transmit the pending frame plus one SIFS interval.

Figure 20:
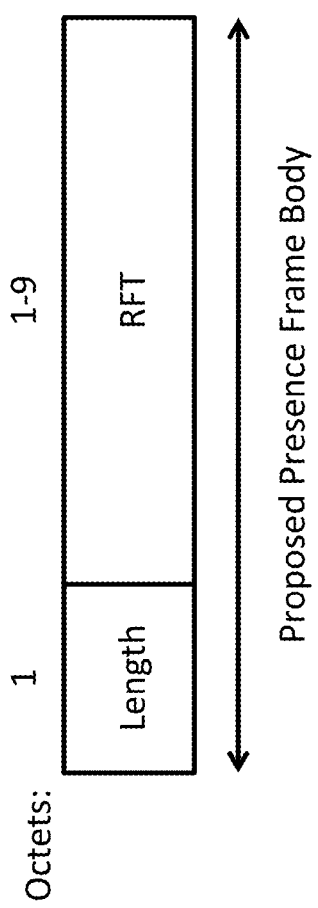
FIG. 20 shows a proposed frame format for DSI+Time Stamp Request Beacon Frame.

The frame format for the DSI+Time Stamp Beacon frame is defined in FIG. 20.

The DSI+Time Stamp frame has the same fields as the DSI Beacon frame but also has a Time Stamp field that contains additional timing information. When time stamping is enabled the PBS counts the time elapsed to the nearest 1.25 nanoseconds from the time when the previous beacon was transmitted. The time passed is inserted into the Time Stamp field which is 8 octets in length.

Figure 21:
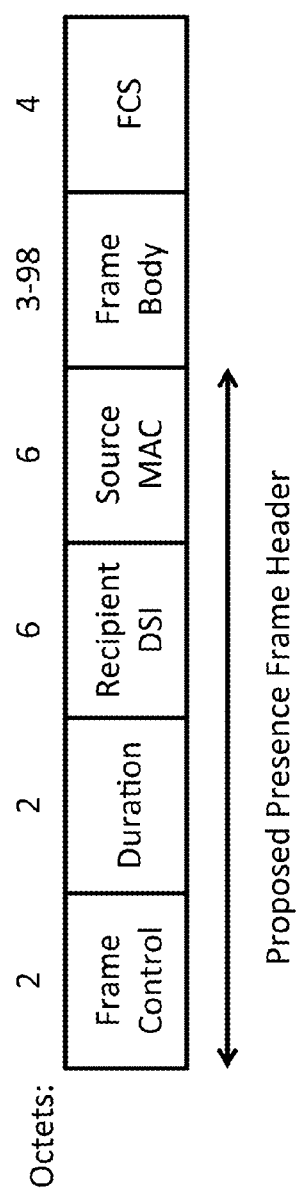
FIG. 21 shows a proposed frame format for WLAN SSID+Key Beacon Frame.

The frame format for the WLAN SSID+Key Beacon frame is defined in FIG. 21.

The Recipient DSI is the DSI of the device authorized to access the WLAN. The source MAC is the MAC address of the WLAN AP. The duration field is set to the time required to transmit the pending frame plus one SIFS interval. The Frame body field can be 3-98 octets in length and its contents are described in section 5.3.2.

Figure 22:
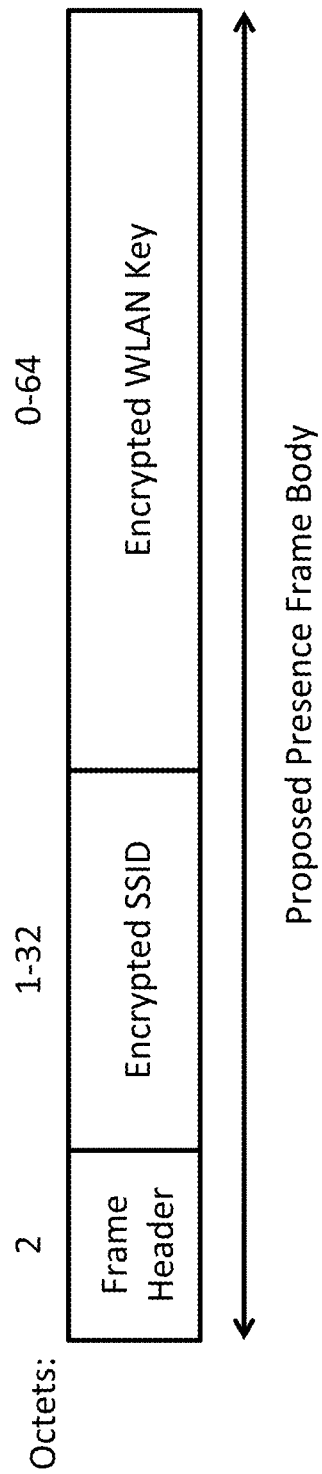
FIG. 22 shows a proposed frame body format for WLAN SSID+Key Frame.

The WLAN Frame body is a minimum of 3 octets and a maximum of 98 octets long. Its format is defined in FIG. 22.

Figure 23:
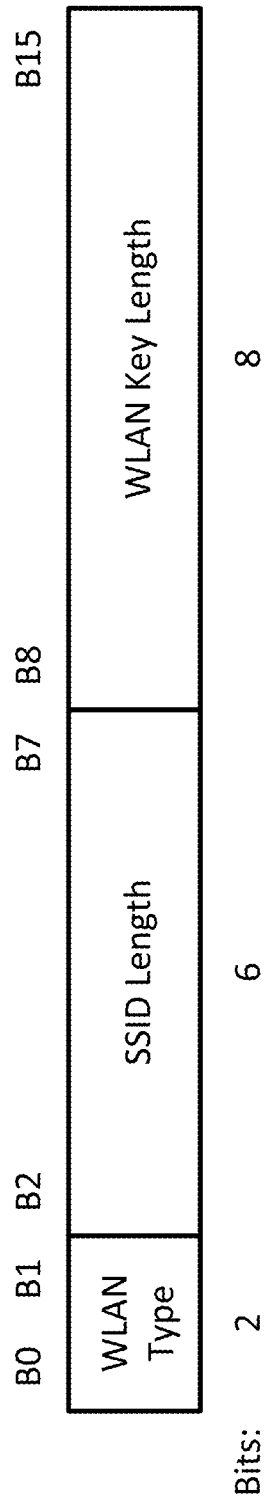
FIG. 23 shows a proposed frame header format for Frame Body of WLAN SSID+Key Frame.

The Frame body header is determined by the type of encryption used by the WLAN, the length of the SSID in bytes and length of the key in bytes and is defined in FIG. 23. The SSID can be from 1 to 32 octets and the key can be 0 to 64 octets long.

The WLAN type is set according the kind of encryption on the WLAN. The possible values for WLAN type are given in Table 3. The SSID Length is the length in octets of the SSID with a maximum value of 32 and the WLAN Key Length is the length in octets of the WLAN encryption key with a maximum value of 64.

TABLE 3

WLAN Type Subfield Combinations

| WLAN Type b0 b1 | WLAN Encryption |
|---|---|
| 00 | Open Unsecure (no key) |
| 01 | WEP |
| 10 | WPA |
| 11 | WPA2 |

The proposed presence protocol is designed to utilize the same set of MAC functionalities as IEEE 802.11. Although it may not need to leverage the entire set of functionality, some of which are needed by 802.11 for frame exchanges with more than one frame involved, the protocol may use the existing contention protocols to determine when to send a packet. In addition to the existing functionality, the protocol may require additional functions which are described in this section. The Scheduling Beacon Function (SBF) determines how frequently the PBS transmits the DSI beacons. The Emergency Beacon Function (EBF) which is triggered on a PBS when the device has EAS mode activated.

The SBF maintains a series of counters that determines when to transmit the next beacon. There are two predefined BSIs of 60 seconds and 15 seconds. By default the PBS uses the BSI of 60 seconds.

The SBF should start a counter that counts down to 0 in the interval specified by the BSI. Once the counter reaches 0 the SBF should start the transmission of a beacon frame. The presence beacon frame should be sent out at the next available opportunity if there are pending frames for 802.11 or if the medium is busy. Once the beacon has been successfully transmitted (note this means the beacon was sent to the physical layer and left it successfully, not necessarily picked up by another device), the SBF resets the counter and repeats the process.

When a DBS beacon is received on the PBS the SBF should switch to using the BSI of 15 seconds. The PBS should send out the next 20 beacons using the shorter BSI (beacons for the next 5 minutes). If a DBS beacon is received during that time it restarts counting the 20 beacons at the shorter BSI. If a DBS beacon is not received then it switches back to the default BSI of 60 seconds.

The SBF can be implemented through either physical or virtual mechanisms or through both. An example implementation is discussed here.

The SBF is required to beacon at a default rate of once every 60 seconds. When a Decrease Beaconing Schedule (DBS) Beacon is received by a PBS, the PBS may initiate a beaconing frequency of 1 beacon every 15 seconds for a period of 5 minutes (the next 20 beacons). If another DBS Beacon is received in that time frame, the PBS may continue to transmit beacons at 15 second intervals for another 5 minutes. When a PBS loses reception of the DBS Beacon it reverts back to the default 60 second interval.

Count_A, type: integer, min:0, max:4, (counts 4×15 s intervals to send beacon every 60 s)
Count_B, type: integer, min: 0, max: 20 (counts 20×15 s intervals to revert to default SBI) SBI, type: Boolean, true=SBI is 60 s, false=SBI is 15 s.

Figure 24:
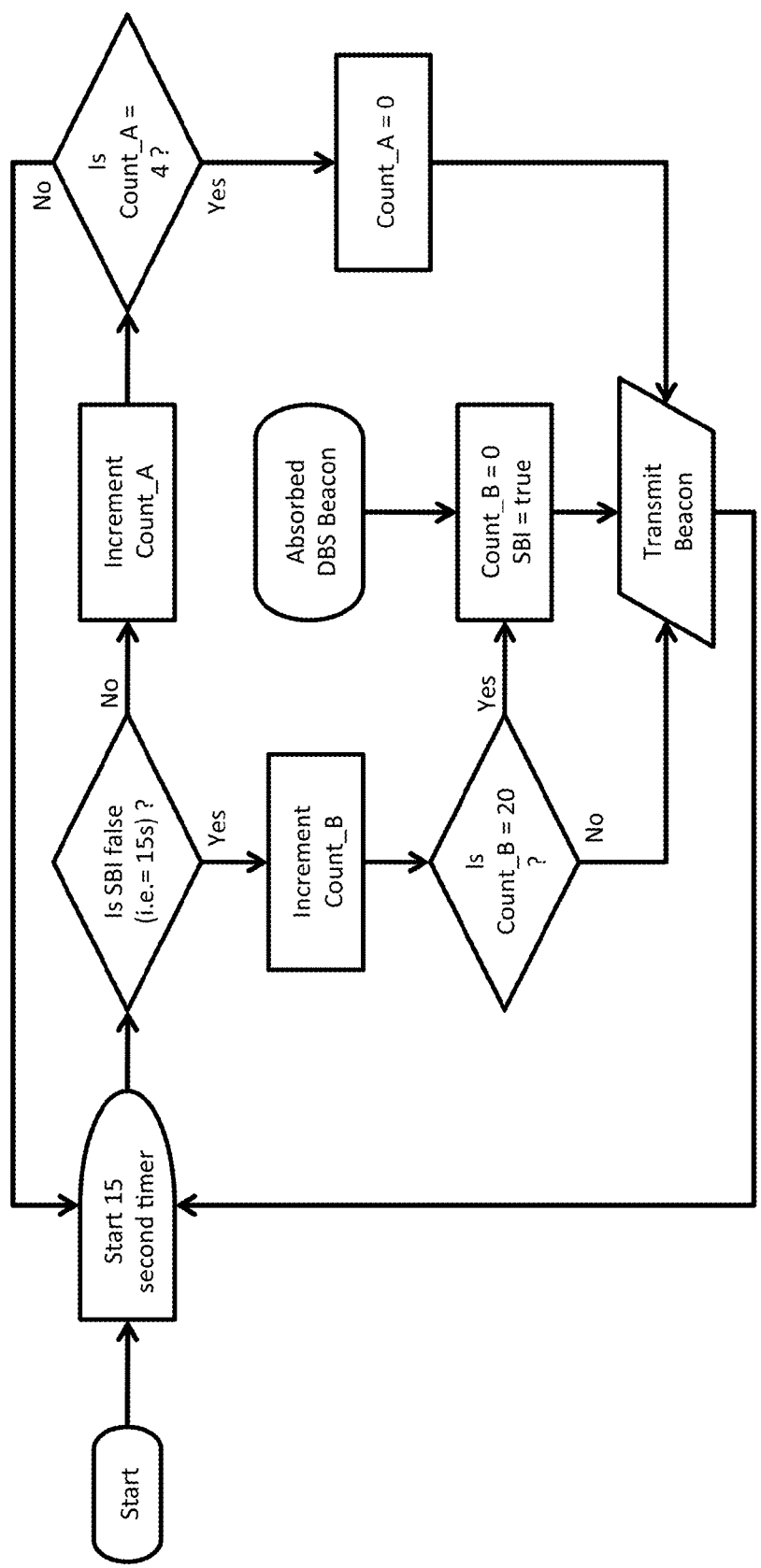
FIG. 24 depicts the flowchart for SBF Implementation.

The flowchart for the SBF implementation is illustrated in FIG. 24.

The pseudo code for the SBF implementation is shown below.

```
integer lasttime = time( ); //current time seconds
integer count_A = 0, count_B = 0;
boolean end = false;
boolean sbi = false;
listener DBS_Beacon ; //thread listening on a port or change in event
while(!end){
if(time( ) - lasttime == 15){
    if(!sbi){
      count_B++;
      if(count_B == 20){
      count_B = 0;
      sbi = true;
}
transmit_beacon( );
}else{
    count_A++;
    if(count_A == 4){
    count_A = 0;
    transmit_beacon( );
}
}
}
if (DBS_Beacon->caughtAction( )) { //listener detected change in state
of a variable/port
    count_B = 0;
    sbi = true;
    transmit_beacon( );
}
lasttime = time( )
}
```

The EBF is used on a PBS when EAS mode is activated on the device. The EBF sets the priority field in the presence header of all beacon frames leaving the PBS to high (see Section 5.1.3.1.3). The EBF overrides any other services trying to access the PHY layer.

The ERF is used on the PDS when it receives a high priority beacon but it resides above the MAC sub-layer.

The proposed protocol uses the same Physical (PHY) layer and frequency hopping mechanisms as IEEE 802.11 which are described in detail in the IEEE 802.11 specification clauses 12, 13, 14 and 15.

In contrast to IEEE 802.11 though, the protocol is designed to use the 1-persistent CSMA mode with no Collision Detection/Avoidance mechanism. Whenever a presence packet is ready to be transmitted, the medium is checked to see if there is an ongoing transmission. If the medium is free then the packet is transmitted right away. If the medium is busy, the PHY layer may wait till the medium is free before transmitting the presence packet.

The following is a detailed description on how the Presence Detection Stations (PDSs) function beyond the physical layer descriptions provided in previous sections.

The primary function of the PDS is to absorb beacon frames emitted by an PBS, and subsequently relaying the Device Specific Identifier (DSI) of the PBS along with relevant metadata identifying the PDS to the Remote Data Server (RDS). All devices acting as a PDS need an Internet connection to be able to communicate with the RDS. The PDS uses the TCP/IP protocol to communicate with the RDS.

The PDS may also maintain a locally cached table of all PBSs currently in its Beacon Detection Area (BDA). The PDS may also emit beacons at regular intervals to all PBSs in its table. The Decrease Beaconing Schedule (DBS) Control Beacon may be sent out to each PBS to trigger shorter beacon emission interval when they are in the BDA (see section 5 for DBS format). If there are radio frequency tags (RFTs) the PDS may also emit a Radio Frequency Tag Enabled Beacon Detection Area (RBDA) Beacon format. The PDS may maintain a schedule for sending out the above mentioned frames to all PBSs in its BDA.

The PDS may perform signal strength analysis on all incoming beacons from the PBSs. PDSs may have an algorithm that allows them to filter PBSs that are emitting below a predefined threshold signal strength level. For locations equipped with multiple PDSs, the PDSs may be able to communicate with each other and compare signal strength analysis data collected at each PDS to better position PBSs.

We now describe the method the proposed proprietary protocol uses to provide location services to emergency responders in the event of a 911 call.

The protocol has a built in mechanism to help Emergency Responders when a 911 call is placed on a Presence Beaconing Station (PBS) such as a mobile device. The Emergency Beacon Function (EBF) on the PBS sets the Priority field in all Presence Beacon Frame Body headers (refer to section 5.1.3.1.3) to high. The EBF also decreases the Beaconing Schedule Interval (BSI) to 15 seconds.

When a Presence Detection Station (PDS) detects a high priority beacon the Emergency Response Function (ERF) is triggered on the PDS. The ERF may cause the PDS to process all high priority beacons before processing beacons of lower priority. If the PDS is part of a Presence Access Point (PAP), the PAP may also beacon the SSID and WLAN authentication key to the PBS.

The EBF on receiving the SSID and WLAN key can decide whether or not to establish a WLAN connection if there is a low or no signal strength on the cellular network. This ensures that even in areas with poor cellular reception a 911 call can still be made if there is PAP coverage.

The ERF also ensures that all information associated with priority beacons are routed through priority channels to the Remote Data Server (RDS). The RDS overrides all privacy settings and may share the presence/location data with Emergency Responders even if the user has not preauthorized his presence/location data to be gathered at the specified location.

The proposed protocol is a new protocol on the 2.4/5 GHz radio frequency. It is designed for presence detection and authentication using the same physical layer instructions of Wi-Fi but with its own proprietary packet format. Any Wi-Fi AP has the basic hardware requirements needed to support presence awareness. This description outlines the additional firmware/design modifications needed to enable existing Wi-Fi APs to become PAPs and be used as part of the presence solution.

Figure 25:
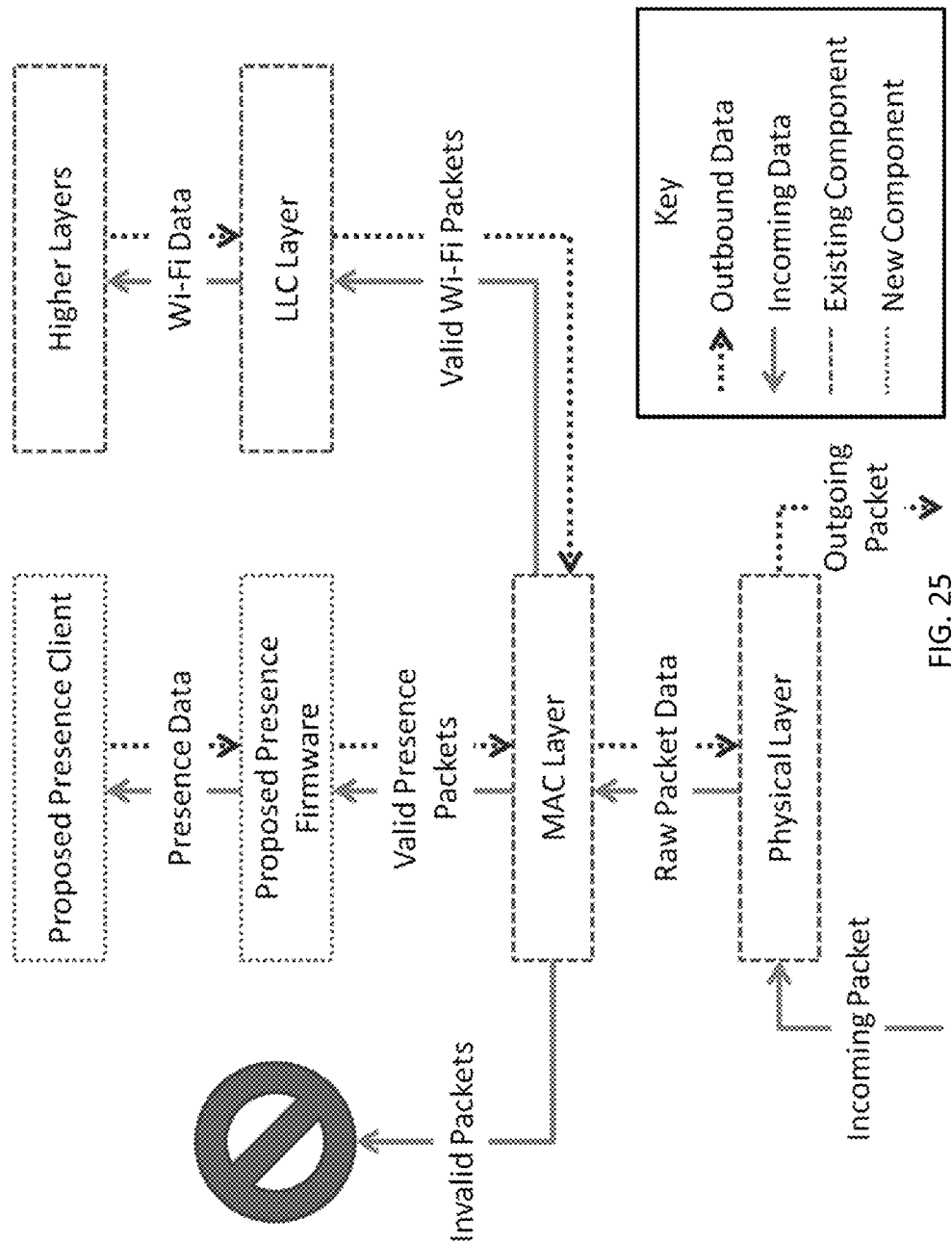
FIG. 25 illustrates the modifications needed to existing Wi-Fi Access Point architecture to derive the proposed Presence Enabled Access Point architecture.

FIG. 25 illustrates the modifications needed to existing Wi-Fi Access Point architecture. The MAC Layer discards all packets captured by the Physical Layer that are either invalid or meant for another destination. A modification may need to be made to the MAC Layer so that presence packets are now routed to a new presence firmware routine for processing. The new firmware inside the AP also has to be able to communicate with the external Remote Data Server.

Figure 26:
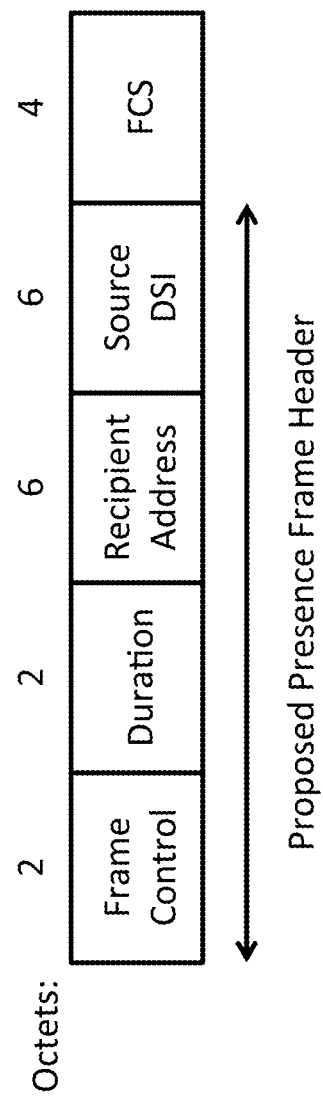
FIG. 26 outlines a proposed basic Presence Packet Structure.

The proposed presence packets have a very similar structure to 802.11 packets with some key differences. The basic packet structure is outlined in FIG. 26.

Figure 27:
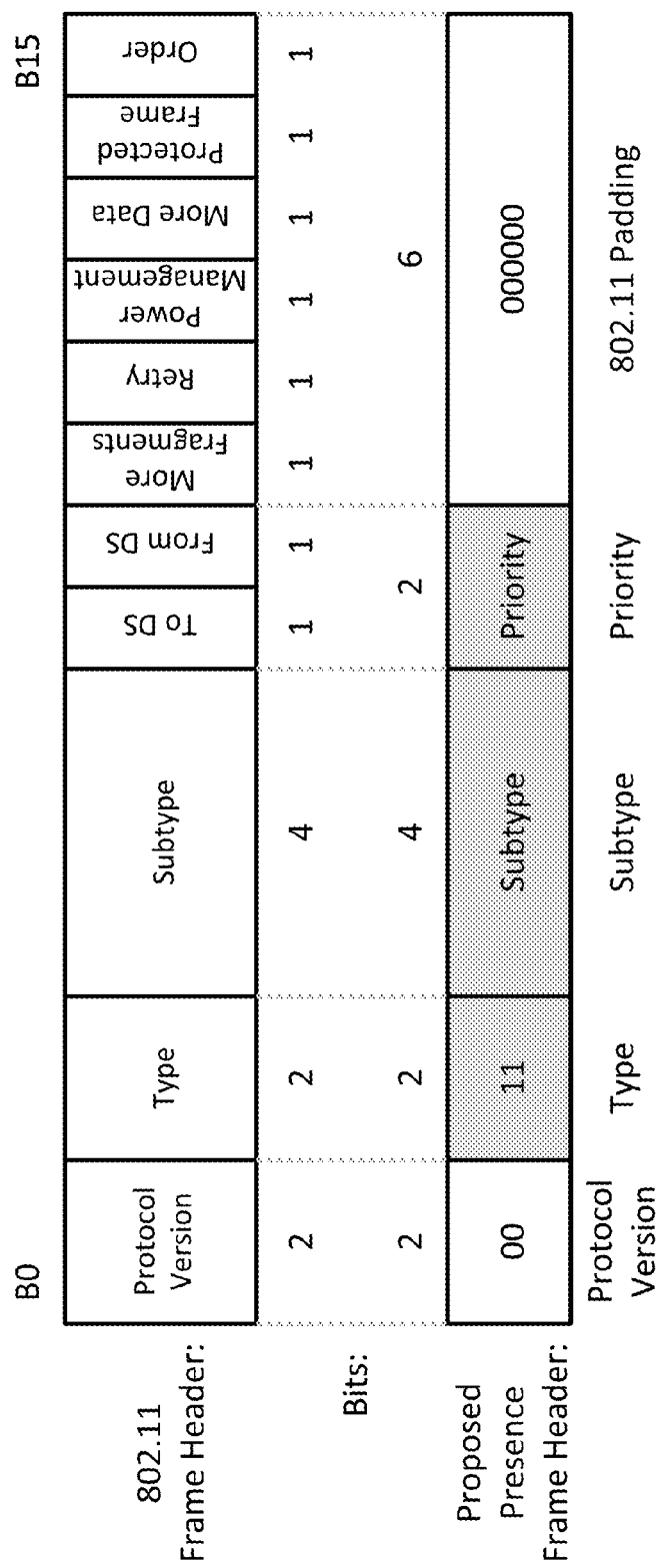
FIG. 27 illustrates subfields and possible values within the proposed Presence Frame Control.

Frame Control: The subfields within the Frame Control are set as illustrated in FIG. 27. The Subtype can take any value from 0x00 to 0x0F while Priority can take any value from 0x00 to 0x03.

Duration: Currently this has no set value in the presence architecture. It has been left intact so the subsequent Address fields line up with 802.11 specifications.

Recipient Address: The address is set to 0xFFFFFFFFFFFF so that any PAP can receive the packet and process it.

Source DSI: The source DSI can be any value from 0x01 to 0xFFFFFFFFFFFE and is unique for each presence enabled mobile device.

FCS: The FCS field is a 32-bit field containing a 32-bit CRC. The FCS is calculated over the previous 16 bytes. The FCS calculation is same as the one specified in IEEE 802.11.

Signal Strength/(Time Stamping): In addition to the packet data the presence firmware routines also need the signal strength of the packet received for establishing device location. Although not a mandatory requirement time stamping at the point of reception helps improve the accuracy of positioning.

Internet Access: The presence firmware routine also needs to be able to communicate with the Remote Data Server via a 4G/3G modem or some other Internet connection.

Figure 28:
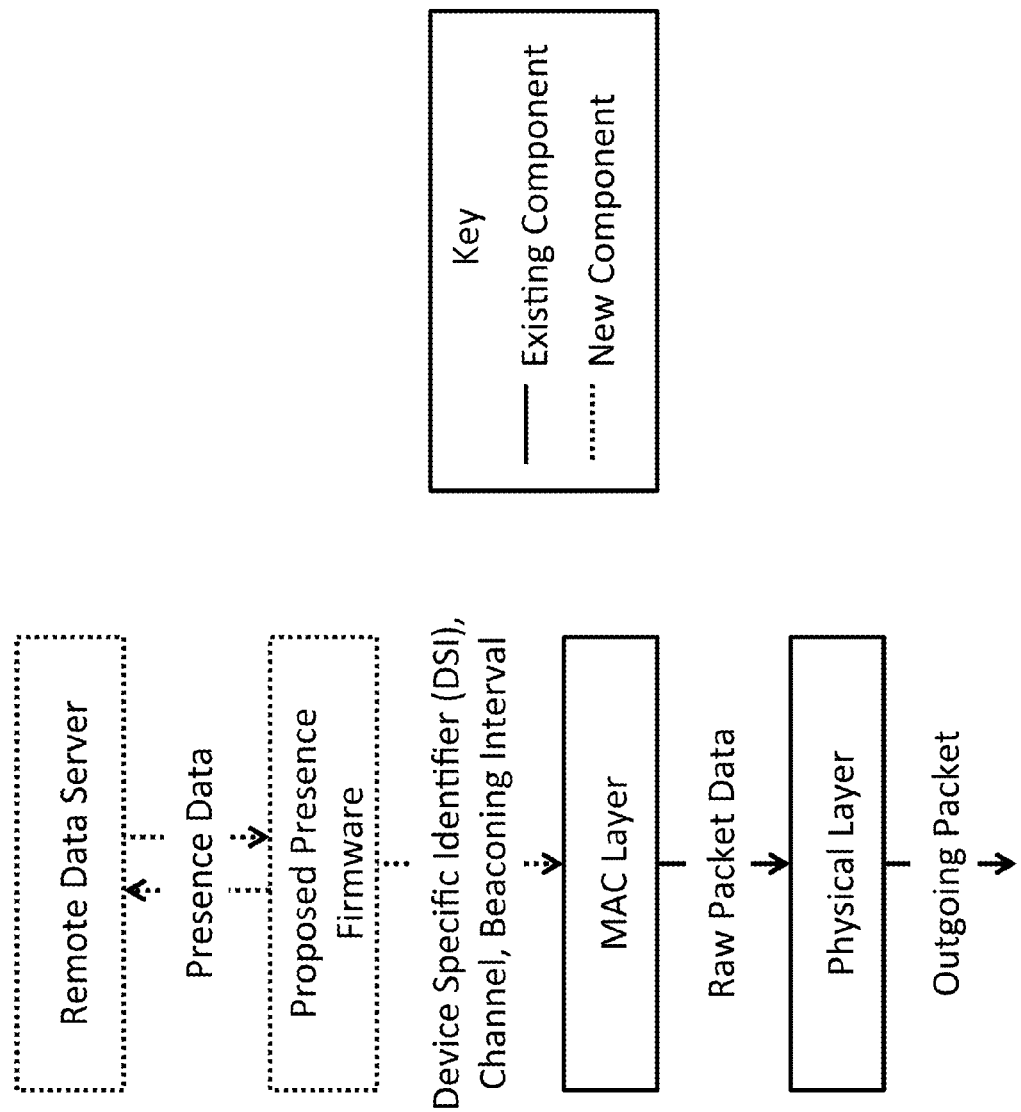
FIG. 28 illustrates the modifications needed to existing Wi-Fi architecture on mobile handsets to derive the proposed Presence Enabled Handset Architecture.

FIG. 28 illustrates the modifications needed to existing Wi-Fi architecture on mobile handsets. A modification may need to be made to the MAC Layer so that presence packets can be sent from the handset. The proposed Presence Client on the device specifies a unique 6 byte Device Specific Identifier which is part of the presence frame. The Presence Client also specifies the 802.11 channel on which the chip needs to transmit the presence frames and the time interval between subsequent beacons.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the methods and systems described herein have been disclosed in connection with certain preferred embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

All documents referenced herein are hereby incorporated by reference.

What is claimed is:

1. A method of profile-based passive network switching, comprising:
    receiving with a presence-enabled wireless access point a presence beacon that is transmitted from a mobile device over a local wireless network channel without requiring authentication of the mobile device to access the local wireless network;
    determining the contents of the beacon, and, based on the determined contents:
        extracting a device-specific identifier from the beacon;
        determining whether the beacon comprises an emergency frame, and if so:
            preparing local wireless network authentication and connection information to facilitate connecting the mobile device to the local wireless network; and
            transmitting the local wireless network authentication and connection information to the mobile device without transmitting the device-specific identifier or provider information of the access point to a networked server; and
        if the beacon is determined to not comprise an emergency frame:
            transmitting the device-specific identifier and provider information of the access point to a networked server configured with presence network switching software for determining network switching requirements for enabling the mobile device to use the local wireless network based on the transmitted device-specific identifier and provider information;
            receiving mobile device network switching data from the server that references device access privileges for network switching that are based on at least one of the transmitted device-specific identifier and the access point provider information;
            preparing local wireless network authentication and connection information that is in compliance with the device access privileges for network switching to facilitate connecting the mobile device to the local wireless network; and
            transmitting the local wireless network authentication and connection information to the mobile device over a network other than the local wireless network;
        wherein a service identifier of the local wireless network is unknown to the mobile device prior to transmitting the local wireless network authentication and connection information.

2. The method of claim 1, wherein the local wireless network is hosted by the presence-enabled wireless access point.

3. The method of claim 1, wherein transmitting the device-specific identifier to the networked server is performed over a network other than the local wireless network.

4. The method of claim 1, further including facilitating wireless communication from the mobile device over the local wireless network.

5. The method of claim 1, wherein further connecting the mobile device to the local wireless network does not require mobile device user interaction.

6. The method of claim 1, wherein prior to transmitting local wireless network authentication and connection information, the mobile device is not authenticated to access the local wireless network.

7. The method of claim 1, wherein the wireless signal comprises an 802.11 compliant radio frequency signal.

8. The method of claim 1, wherein the presence beacon comprises a recipient-independent recipient address.

9. The method of claim 1, wherein the access point is adapted to receive and extract a device-specific identifier from the beacon.

10. The method of claim 1, wherein a MAC layer function of the access point is adapted to route at least data packets of the presence beacon to presence firmware executing on the access point.

11. A method of profile based passive network switching, comprising:
    receiving with a presence-enabled wireless access point a presence beacon that is transmitted from a mobile device via a local wireless network channel over which the local wireless network communicates without requiring authentication of the mobile device to access the local wireless network, wherein the mobile device is connected to a cellular data network;
    determining the contents of the beacon, and, based on the determined contents:
        extracting a device-specific identifier from the beacon;
        determining whether the beacon comprises an emergency frame, and if so:
            preparing local wireless network authentication and connection information to facilitate connecting the mobile device to the local wireless network; and
            transmitting the local wireless network authentication and connection information to the mobile device without transmitting the device-specific identifier or provider information of the access point to a networked server; and
        if the beacon is determined to not comprise an emergency frame:
            transmitting the device-specific identifier and provider information of the access point to a networked server configured with presence network switching software for determining network switching requirements for enabling the mobile device to use the local wireless network based on the transmitted device-specific identifier and provider information;
            receiving mobile device network switching data from the server that references cellular network provider local network access privileges that are based on the transmitted device-specific identifier;
            preparing local wireless network authentication and connection information that is in compliance with the local network access privileges to facilitate connecting the mobile device to the local wireless network;

transmitting the local wireless network authentication and connection information to the mobile device over the cellular data network; and facilitating data communication of the mobile device via the local wireless network rather than through the cellular data network;

wherein a service identifier of the local wireless network is unknown to the mobile device prior to transmitting the local wireless network authentication and connection information.

12. The method of claim 11, wherein facilitating data communications of the mobile device over the local wireless network does not require mobile device user interaction.

13. The method of claim 11, wherein prior to transmitting local wireless network authentication and connection information, the mobile device is not authenticated to access the local wireless network.

14. The method of claim 11, wherein facilitating data communications of the mobile device via the local wireless network comprises activating a Wi-Fi radio function of the mobile device.

15. The method of claim 11, wherein the network switching requirements are further based on an application specific user hash that is derived from the device-specific identifier.

16. The method of claim 11, wherein the local wireless network is hosted by the presence-enabled wireless access point.

17. The method of claim 11, wherein transmitting the device-specific identifier to the networked server is performed over a network other than the local wireless network.

18. The method of claim 11, wherein the presence beacon comprises a recipient-independent recipient address.

19. The method of claim 11, wherein a MAC layer function of the access point is adapted to route at least data packets of the presence beacon to presence firmware executing on the access point.

20. The method of claim 11, wherein facilitating data communication of the mobile device via the local wireless network comprises facilitating routing of a call occurring on the cellular network through the local wireless network.

* * * * *